United States Patent [19]
Tamura et al.

[11] Patent Number: 5,159,507
[45] Date of Patent: Oct. 27, 1992

[54] TAPE RECORDING AND/OR REPRODUCING APPARATUS WITH A SINGLE MOTOR FOR DRIVING ITS ROTARY HEADS, CAPSTAN AND REEL BASES

[75] Inventors: Masafumi Tamura, Kanagawa; Masato Tanaka; Takashi Katoku, both of Tokyo; Morihiro Komoriya, Chiba, all of Japan

[73] Assignee: Sony Corporation, Tokyo, Japan

[21] Appl. No.: 621,348

[22] Filed: Nov. 30, 1990

[30] Foreign Application Priority Data

Dec. 6, 1989 [JP] Japan .................... 1-317017

[51] Int. Cl.$^5$ ............................................. G11B 15/34
[52] U.S. Cl. ........................................ 360/85; 360/95
[58] Field of Search .................. 360/85, 95, 96.1–96.4; 242/200, 201

[56] References Cited

U.S. PATENT DOCUMENTS

| | | | |
|---|---|---|---|
| 3,766,328 | 10/1973 | Warren | 360/85 |
| 3,979,772 | 9/1976 | Umeda | 360/95 |
| 4,008,489 | 2/1977 | Gilsdori et al. | 360/85 |
| 4,213,162 | 7/1980 | Lemelson | 360/85 |
| 4,956,732 | 9/1990 | Moriyama | 360/95 |

FOREIGN PATENT DOCUMENTS 0003444 8/1979 European Pat. Off. .
0022651 1/1981 European Pat. Off. .
2367330 5/1978 France .

OTHER PUBLICATIONS

IEEE Transactions on Consumer Electronics vol. CE-25, No. 4, Aug. 1979, New York, U.S. pp. 440–445.
Patent Abstracts of Japan vol. 8, No. 282 (P-323) (1719) Dec. 22, 1984 and JP-A-59 146 406 (Sony K.K.) Aug. 22, 1984.

*Primary Examiner*—David J. Severin
*Attorney, Agent, or Firm*—Alvin Sinderbrand; William S. Frommer

[57] ABSTRACT

In a tape recording and/or reproducing apparatus having a head drum and a plurality of rotary elements including at least rotary heads associated with the head drum for recording and/or reproducing information signals on a magnetic tape wrapped around the head drum, a capstan for transporting the magnetic tape at a constant speed, and supply and take-up reel bases for engaging a pair of reels around which the magnetic tape is wound in a tape cassette and for driving the respective reels; a single motor is directly coupled to one of the rotary elements and drives the other rotary elements through a non-slip mechanical transmission for synchronously rotating at least the rotary heads, the capstan and the supply and take-up reel bases.

19 Claims, 22 Drawing Sheets

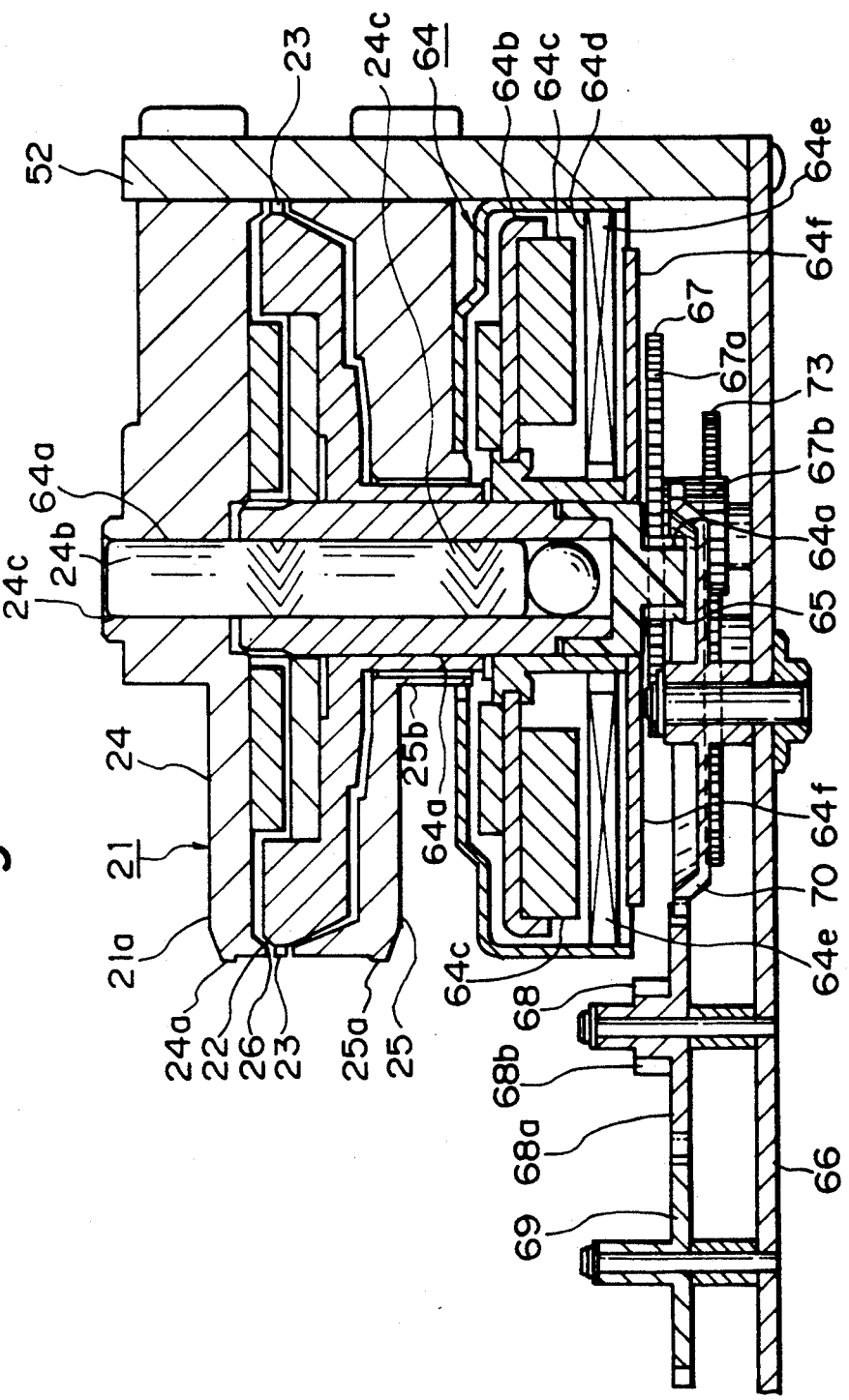

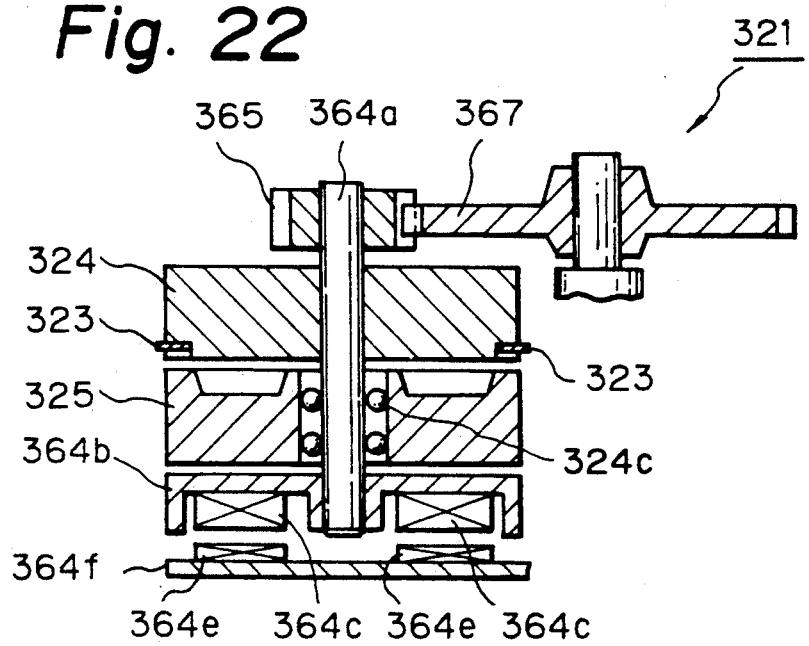
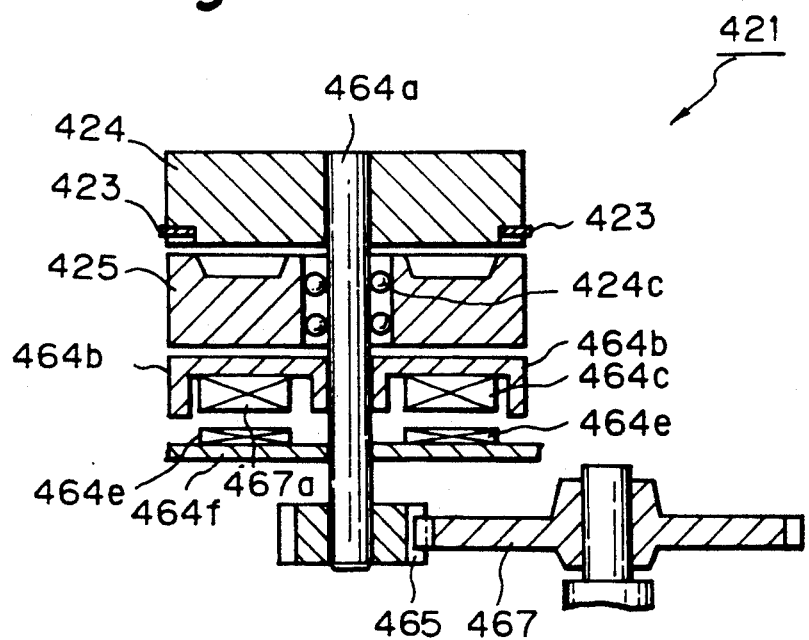

TAPE RECORDING AND/OR REPRODUCING APPARATUS WITH A SINGLE MOTOR FOR DRIVING ITS ROTARY HEADS, CAPSTAN AND REEL BASES

BACKGROUND OF THE INVENTION

1. Field of the Invention

This invention relates generally to a rotary head tape recording and/or reproducing apparatus and, more particularly, is directed to the miniaturization of such apparatus.

2. Description of the Prior Art

In a tape player having rotary heads, it is necessary to effect rotation of a capstan for transporting the tape and at least a take-up reel base for rewinding the tape in addition to rotating the rotary heads. When the rotary heads, capstan and take-up reel base are driven by respective motors, the current consumption by the several motors is undesirably large, and such arrangement is further disadvantageous in that a driving circuit is required for each motor and a relatively large space is required for installing the several motors so that miniaturization of the apparatus cannot be attained.

If the number of motors is reduced, and a belt transmission is employed for rotating the several elements of the apparatus to be driven thereby, other problems are encountered, namely, the transmission loss is relatively high, the durability of the transmission is low and precise rotational synchronism between the rotated members, for example, the rotary heads and the capstan, cannot be achieved.

OBJECTS AND SUMMARY OF THE INVENTION

Accordingly, it is an object of this invention to provide a rotary head tape recording and/or reproducing apparatus which can be readily miniaturized, and which has reduced power consumption.

Another object of the invention is to provide a rotary head tape recording and/or reproducing apparatus, as aforesaid, in which the rotary movements of the rotary heads, and capstan and take-up reel base can be precisely synchronized with each other.

Still another object of the invention is to provide a rotary head tape recording and/or reproducing apparatus, as aforesaid, in which the rotary elements, such as, the rotary heads associated with the head drum for recording and/or reproducing information signals on a magnetic tape wrapped around the head drum, a capstan for transporting the magnetic tape at a constant speed, and supply and take-up reel bases for engaging a pair of reels around which the magnetic tape is wound in a tape cassette and for driving the respective reels, are all driven by a single motor in a precisely synchronized manner.

In accordance with an aspect of this invention, in a tape recording and/or reproducing apparatus having a head drum and a plurality of rotary elements including at least rotary head associated with the head drum for recording and/or reproducing information signals on a magnetic tape wrapped around at least a portion of a peripheral surface of the head drum, a capstan for transporting the magnetic tape at a constant speed, and supply and take-up reel bases for engaging a pair of reels around which the magnetic tape is wound in a tape cassette and for driving the respective reels; a single motor is directly coupled to one of the rotating elements, for example, the rotary heads and a nonslip mechanical transmission is also coupled with the motor for driving the remainder of the rotary elements therefrom and thereby synchronously rotating at least the rotary heads, the capstan and the take-up and supply reel bases.

In accordance with another aspect of this invention, in a tape recording and/or reproducing apparatus, as aforesaid, the head drum is mounted on a first support structure which is guided for movements relative to a second support structure on which the supply and take-up reels bases are mounted, and mode selecting means are provided for selectively positioning the first support structure relative to the second structure in a first position corresponding to recording and reproducing modes and at which a substantial part of the head drum is inserted into a tape cassette having its reels engaged by the supply and take-up reel bases so that the magnetic tape extending between the reels is wrapped around a substantial portion of the peripheral surface of the head drum for scanning by the rotary heads, a second position corresponding to cassette loading and unloading modes and at which the head drum is fully withdrawn from the tape cassette, and a third position corresponding to stop, fast-forward and rewind modes and at which the head drum is disposed intermediate the first and second positions thereof so as to be only slightly inserted into the tape cassette. In the mentioned third position, the peripheral surface of the head drum desirably comes into contact with the magnetic tape extending between the reels engaging the reel bases so that the rotary heads can pickup recorded identifying data, as in a fast search mode.

The above, and other objects, features and advantages of the present invention, will be readily apparent in the following detailed description of embodiments thereof when read in connection with the accompanying drawings in which corresponding elements are identified by the same reference numerals in the several views of the drawings.

BRIEF DESCRIPTION OF THE DRAWINGS

FIG. 13 is an enlarged vertical sectional view of a head drum and motor assembly included in the apparatus of FIG. 4;

FIGS. 20-23 are schematic vertical sectional views diagrammatically illustrating respective arrangements of a head drum, motor and gear transmission in tape recording and/or reproducing apparatus in accordance with other embodiments of the invention.

DETAILED DESCRIPTION OF THE PREFERRED EMBODIMENTS

Figure 1:
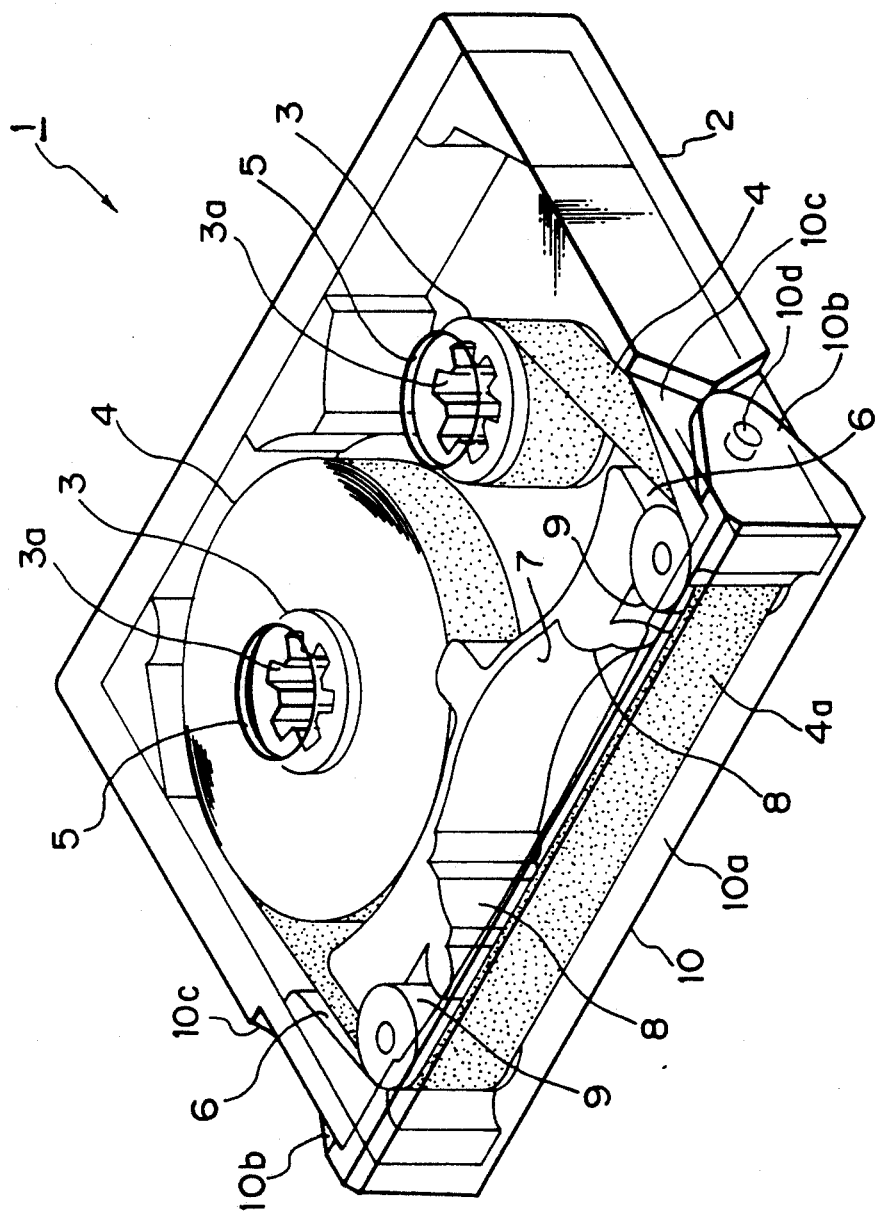
FIG. 1 is a perspective view of a tape cassette intended for use in a rotary head tape recording and/or reproducing apparatus according to an embodiment of the present invention.
Figure 2:
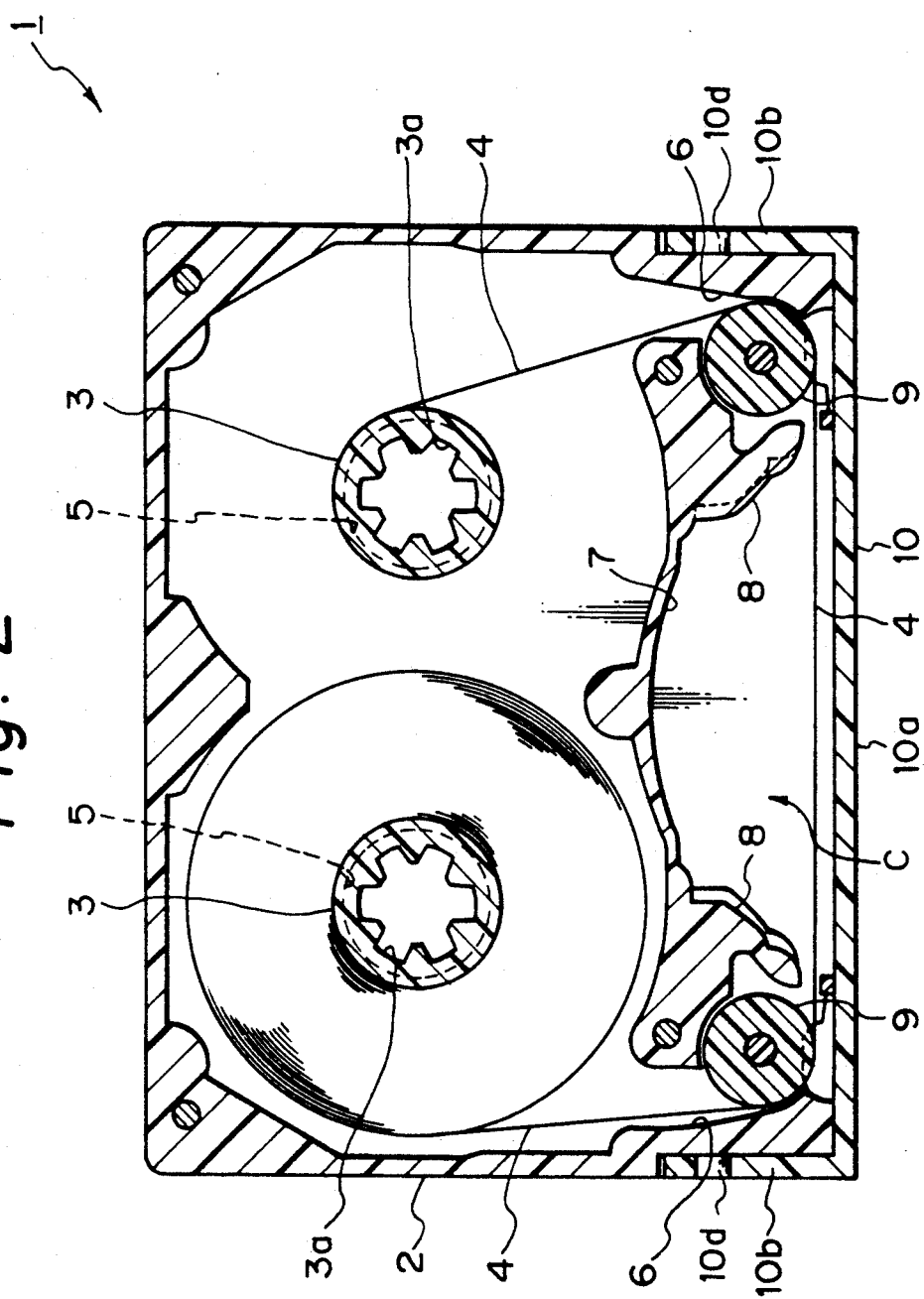
FIG. 2 is a horizontal sectional view of the tape cassette of FIG. 1.

Referring to the drawings in detail, and initially to FIGS. 1 and 2 thereof, it will be seen that a tape cassette 1 for use in a tape recording and/or reproducing apparatus according to the present invention includes a cassette casing 2 of rectangular flat box-like configuration which is laterally elongated. Two tape reels 3 are rotatably contained within the cassette casing 2 at laterally spaced apart positions, and a magnetic tape 4 is wound around the reels 3 and extends therebetween within the cassette casing 2. Pairs of aligned holes 5 are formed in the opposed top and bottom wall panels of the cassette casing 2 and register with sockets 3a formed in the reels 3 so as to provide access to such sockets from the outside of the cassette casing 2.

Tape exits 6 are formed in the cassette casing 2 adjacent the opposite ends of the open front side of the cassette casing, and the magnetic tape 4 between the reels 3 extends through the tape exits 6 so that a run 4a of the tape can extend along the open front side of the cassette casing. A concave partition 7 extends laterally within the cassette casing 2 between the tape exits 6 and is recessed in respect to the open front side of the cassette casing to define a drum-receiving cavity C (FIG. 2). Opposite side portions of the partition 7 are formed with locating surfaces 8 which project forwardly in the cavity C so as to be engagable with a head drum of a tape recording and/or reproducing apparatus inserted in the cavity, as hereinafter described, for achieving precise relative positioning of the head drum and the tape cassette 1 during recording and/or reproducing operations. Pinch rollers 9 are rotatably mounted within the cassette casing 2 between end portions of the partition 7 and adjacent end walls of the cassette casing and are operative to guide the tape between the run 4a and the tape exits 6.

Figure 3A:
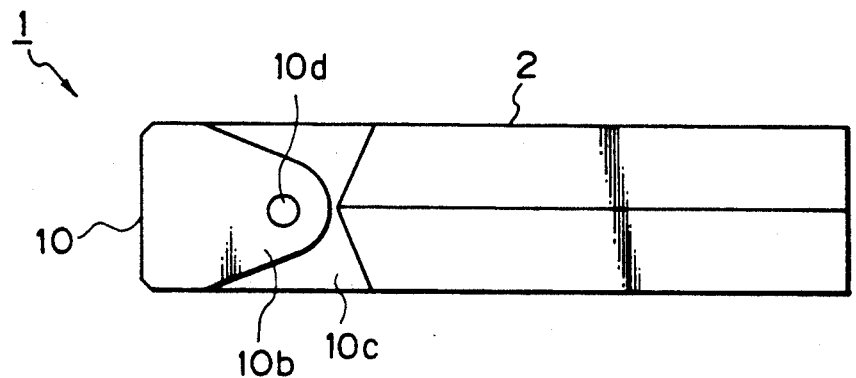
FIGS. 3A and 3B are side elevational views of the tape cassette of FIG. 1, and show the lid of the tape cassette in closed and opened positions, respectively.
Figure 3B:
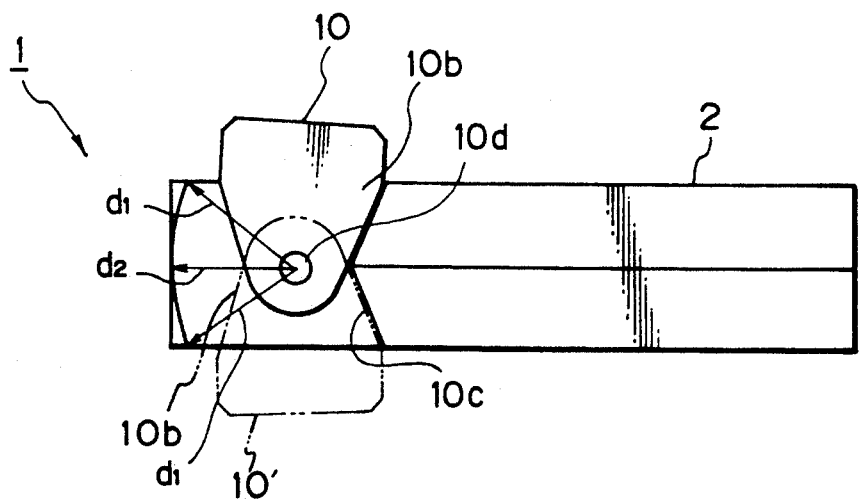

The tape cassette 1 further includes a lid 10 molded of a synthetic resin which is somewhat elastic. The lid 10 includes an elongated cover portion 10a adapted to extend across the open front side of the cassette casing 2 for closing the same, and integral ears 10b directed at right angles rearwardly from the opposite ends of the cover portion 10a. The ears 10b are received in recesses 10c formed in the opposite end surfaces of the cassette casing 2 adjacent the front side of the latter, and the ears 10b are pivotally mounted on pins 10d projecting from the cassette casing 2 within the recesses 10c. Thus, the lid 10 is mounted for movement relative to the cassette casing 2 between a closed position shown on FIG. 3A, and one or the other of two opened positions respectively shown in full lines at 10, and in dot-dash lines at 10' on FIG. 3B. A distance $d_1$ measured radially from the pivoting axis of the lid 10 to the upper and lower edges or corners of the front side of the cassette casing 2 is slightly larger than the radially distance $d_2$ measured from such pivoting axis to the front side of the cassette casing midway between the upper and lower edges (FIG. 3B). Further, such radial dimension $d_2$ is approximately equal to the radial distance from the pivoting axis of the lid 10 to the inner surface of the cover portion 10a thereof. By reason of the foregoing dimensional relationships, when moving the lid 10 from its closed position (FIG. 3A) to either one of the opened positions shown on FIG. 3B, the cover portion 10a of the lid is elastically stretched or deformed to a small extent in passing the upper or lower edge of the front side of the cassette casing 2. Thus, the upper and lower edges of the front side of the cassette casing 2 cooperate with the inner surface of the cover portion 10a of the lid 10 to provide a detent action by which the lid is releasably retained in its closed position.

Figure 4:
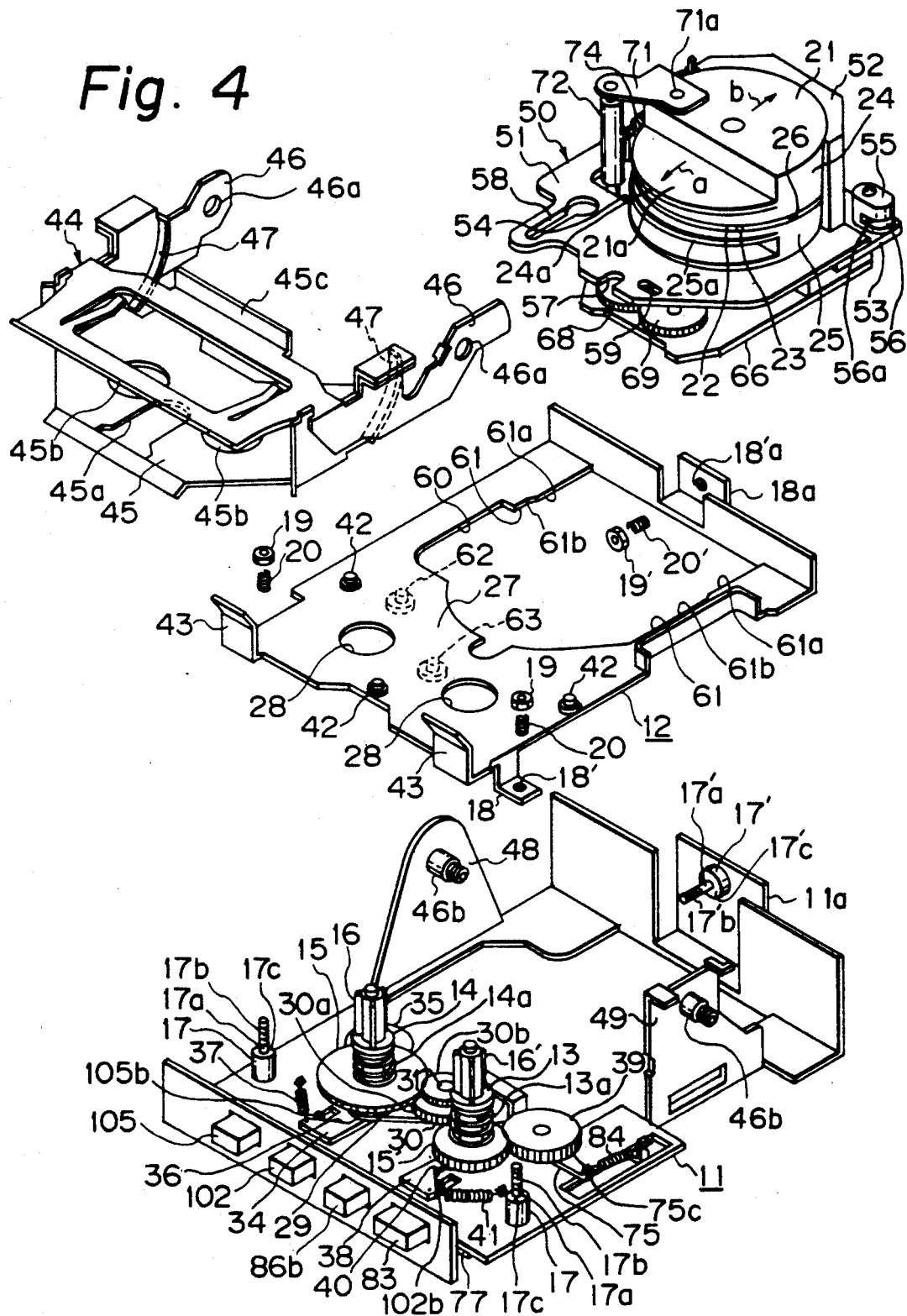
FIG. 4 is a an exploded perspective view of a rotary head tape recording and/or reproducing apparatus according to an embodiment of the present invention.

Referring now to FIG. 4, it will be seen that a tape recording and/or reproducing apparatus according to an embodiment of the present invention, and which is adapted to be used in connection with tape cassettes of the type described above with reference to FIGS. 1-3, generally comprises a main chassis 11 and a sub-chassis 12. Reel bases 13 and 14 are rotatably mounted, at laterally spaced apart positions, on the front portion of the main chassis 11. The reel base 14 has a reel base gear 15 rotatably mounted on its lower portion and being frictionally coupled with a reel engaging shaft 16 directed upwardly on the reel base 14. The reel base 13 similarly has a reel base gear 15' and a reel engaging shaft 16' frictionally coupled with the gear 15'. When the reel base gears 15 and 15' are rotated by a driving mechanism as hereinafter explained in detail, the reel engaging shafts 16 and 16' are frictionally driven so as to rotate the reels 3 of a tape cassette which has been operatively positioned so as to have the reel engaging shafts 16 and 16' seated in the reel sockets 3'.

For mounting the sub-chassis 12 on the main chassis 11, the latter has locating pins 17 extending upwardly therefrom adjacent the opposite sides of the forward portion of the main chassis. The locating pins 17 have reduced diameter upper end portions 17a which are threaded, as at 17b. Further, each of the locating pins 17 has an annular upwardly facing shoulder 17c between the respective reduced diameter upper end portion 17a and the relatively larger diameter lower portion of the respective pin 17. The sub-chassis 12 has downwardly and outwardly directed tabs 18 extending from the opposite sides of its forward portion, and each formed with a hole 18 which is adapted to receive the reduced diameter upper end portion 17a of the respective one of the locating pins 17 so that the tabs 18 seat on the annular shoulders 17c of the respective locating pins. Stop nuts 19 are adjustably screwed on the threaded upper end portions 17a of the locating pins 17 above coil springs 20 which are compressed to yieldably urge the tabs 18 against the annular shoulders 17c.

The back end portion of the main chassis 11 is provided with an upwardly directed, laterally centered bracket portion 11a from which a locating pin 17' extends forwardly. Similarly to the locating pins 17, the locating pin 17' has a reduced diameter end portion 17'a which is threaded at 17'b and which defines an annular shoulder 17'c between the reduced diameter end portion 17'a and the remainder of the locating pin 17'. Further, the sub-chassis 12 has a centrally located, rearwardly and upwardly bent tab 18a extending from its back end portion and formed with a hole 18'a dimensioned to receive the reduced diameter end portion 17'a of the locating pin 17'. A coil spring 20' is disposed on the reduced diameter end portion 17'a of the locating pin 17' between a stop nut 19' and the tab 18a so that the spring 20' yieldably urges the tab 18a of the sub-chassis 12 to seat against the annular shoulder 17'c at the back portion of the main chassis 11.

It will be appreciated from the above that the sub-chassis 12 is yieldably urged against the annular shoulders 17c and 17'c of the locating pins 17 and 17' on the main chassis 11 by the spring forces exerted by the coil springs 20 and 20'. Therefore, if stresses applied to the main chassis 11 cause distortion thereof, such distortion can be accommodated by movement of one or more of the tabs 18 and 18a away from the respective annular shoulder or seat 17c or 17'c so as to avoid transmission of the distortion to the sub-chassis 12 which can thereby accurately retain its designed configuration.

Figure 6:
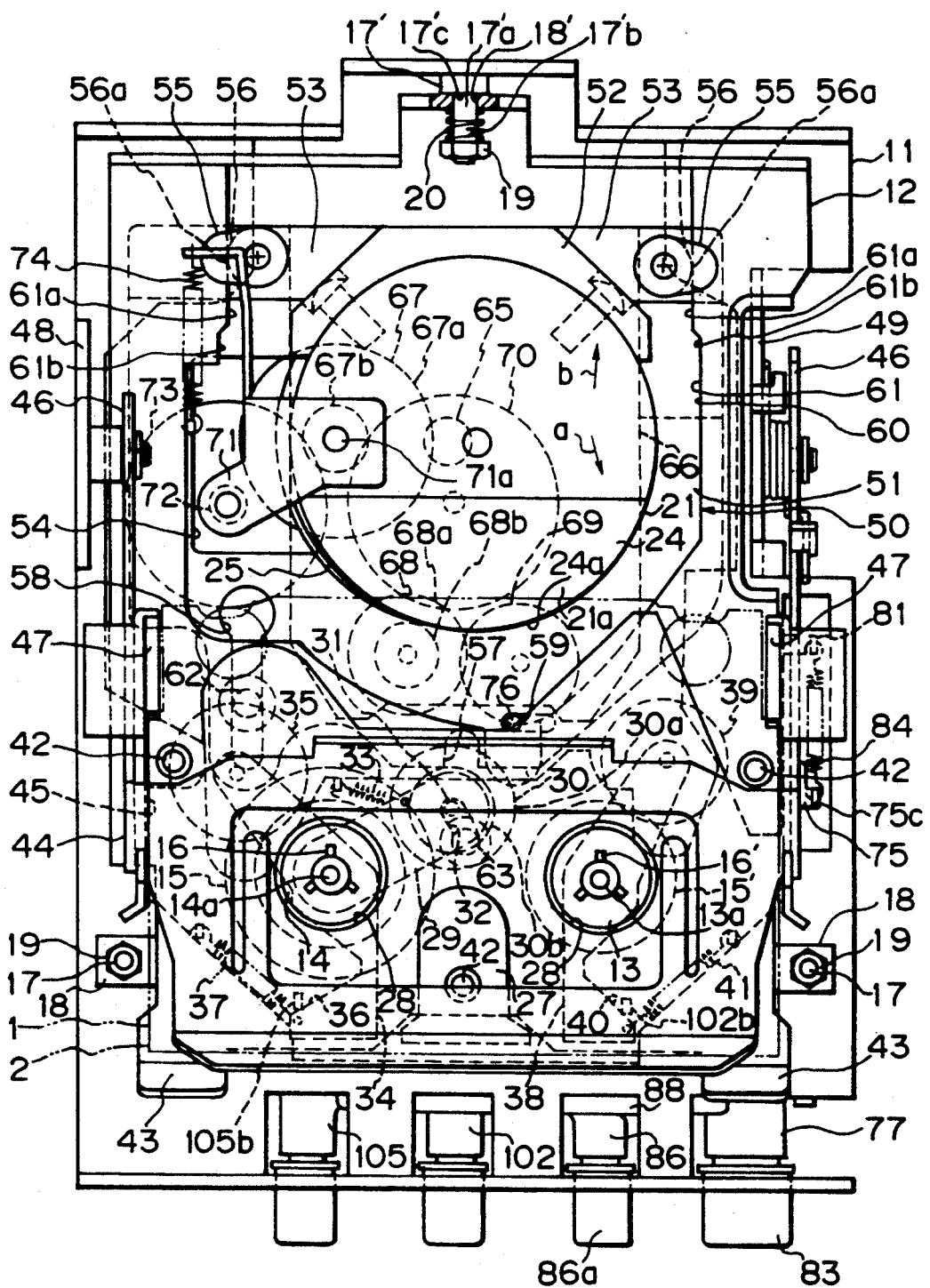
FIG. 6 is a plan view of the apparatus of FIG. 4 in its assembled condition.

The tape recording and/or reproducing apparatus according to an embodiment of this invention is shown on FIG. 4 to further comprise a head drum assembly 21 which is supported on the sub-chassis 12 so as to be moveable relative thereto in the forward and rearward directions indicated by the arrows a and b, respectively, on FIGS. 4 and 6.

As shown particularly on FIG. 13, the head drum assembly 21 of the embodiment of the invention being presently described is of the type having a rotatable middle drum portion 22 provided with magnetic heads 23 suitably supported at spaced apart locations on its outer peripheral surface so as to be moveable in a circular path within an annular gap 26 defined between the outer peripheries of upper and lower fixed drum portions 24 and 25. The top surface of the upper drum portion 24 has its forward portion stepped downwardly so that the resulting forward portion 21a of the head drum assembly 21 has a vertical dimension measured between the top and bottom surfaces of the upper and lower drum portions 24 and 25, respectively, which is slightly smaller than the vertical dimension within the cavity C at the open front side of the cassette casing 2. Thus, with the lid 10 in one of its opened positions, the forward portion 21a of the head drum assembly 21 can be inserted through the open front side of the cassette casing 2 and into the cavity C defined by the concave partition 7.

As further shown on FIGS. 4 and 13, slightly projecting ridges 24a and 25a are formed along the upper and lower edge portions of the peripheral surfaces of upper and lower drums 24 and 25, respectively, at the front portion 21a of the drum assembly. The vertical distance between the projecting ridges 24a and 25a is slightly larger than the width of the magnetic tape 4 contained in a tape cassette 1 intended for use with the tape recording and/or reproducing apparatus so that the tape 4 can travel along the peripheral surfaces of the drums 24 and 25 between the ridges 24a and 25a.

Figure 7:
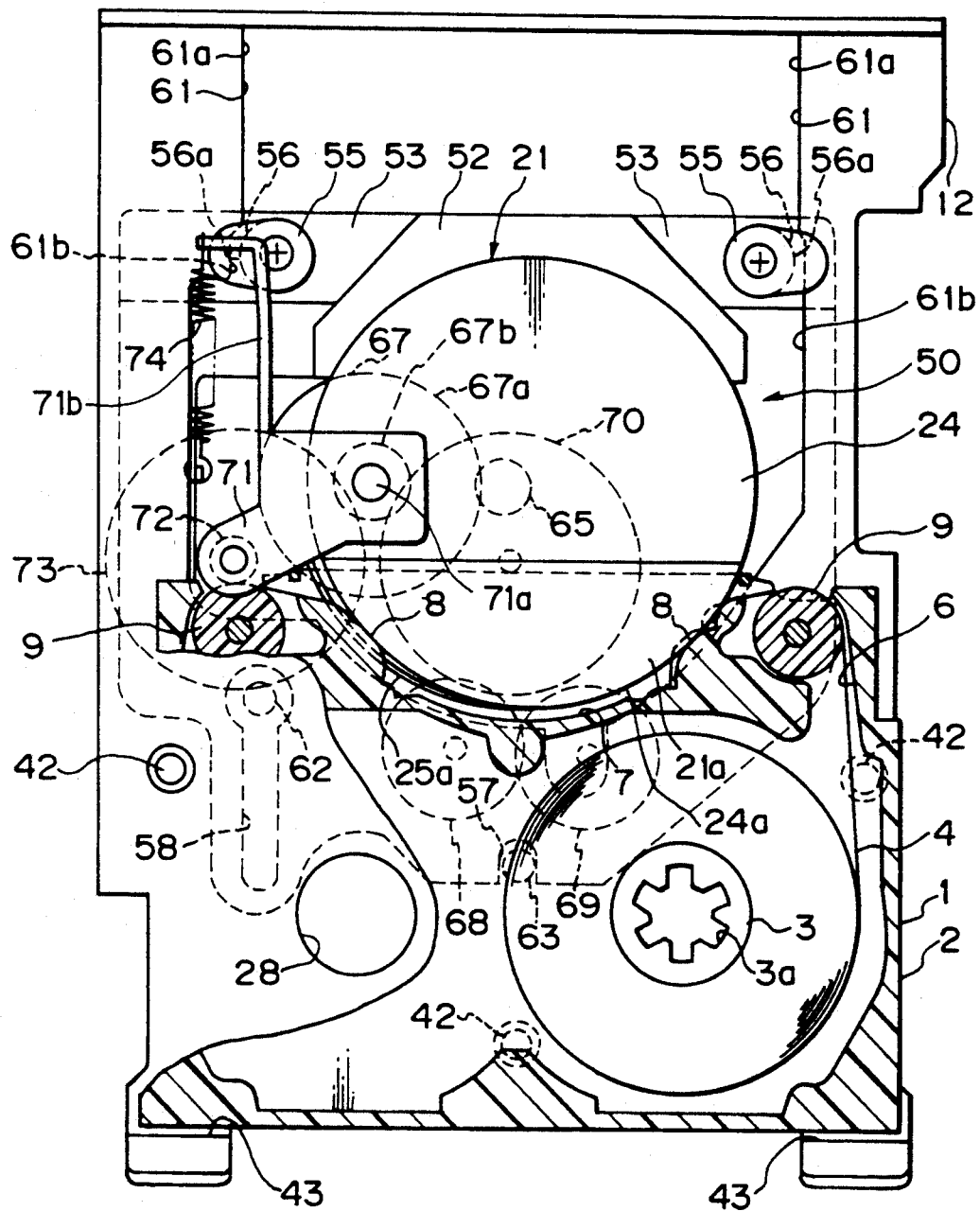
FIG. 7 is an enlarged plan view of a portion of the apparatus of FIG. 6 shown partly broken away, and with a head drum of the apparatus located at a first position for maximum insertion into an operatively positioned tape cassette.
Figure 8:
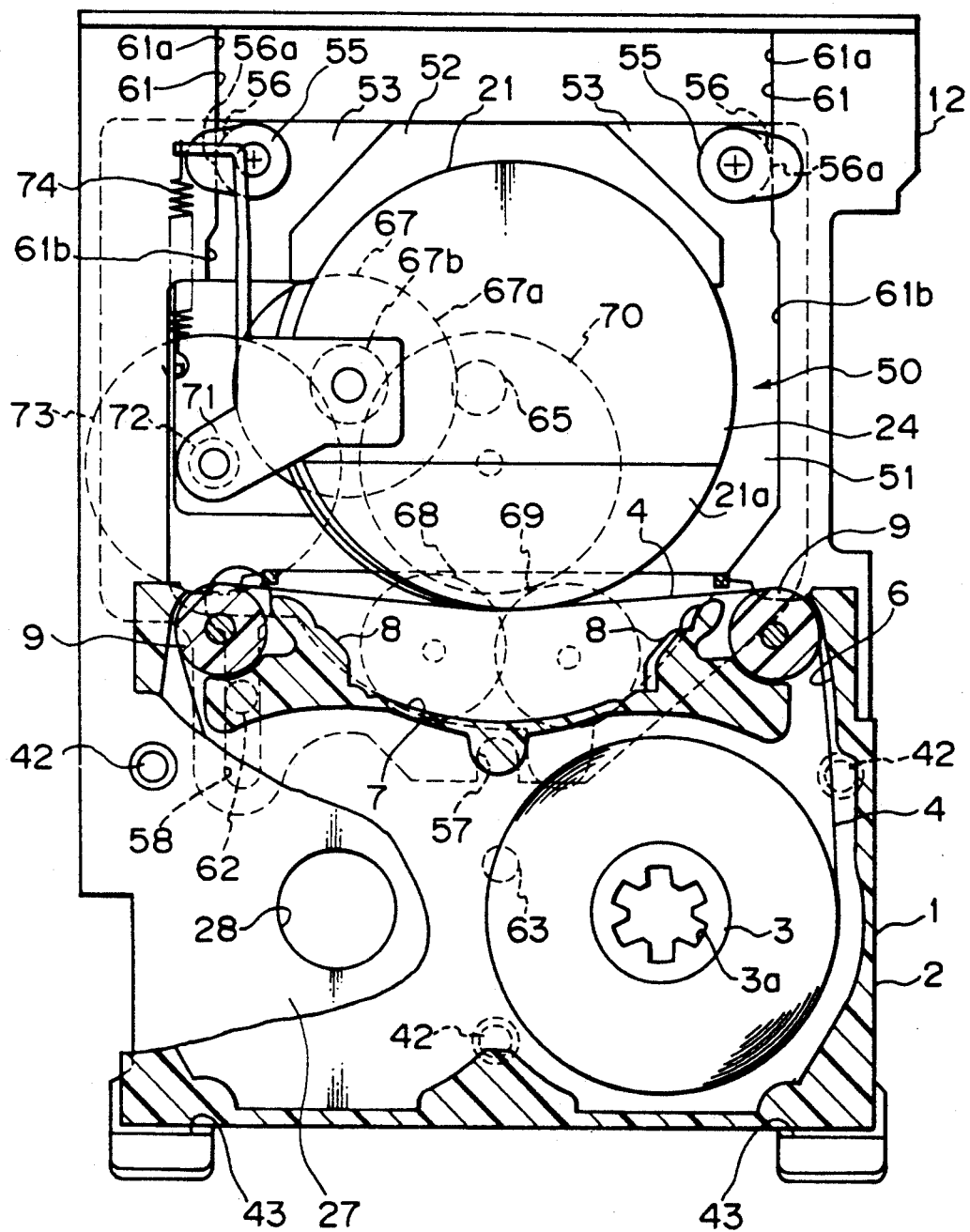
FIG. 8 is a view similar to that of FIG. 7, but with the head drum of the apparatus located in another position relative to the operatively positioned tape cassette.
Figure 9:
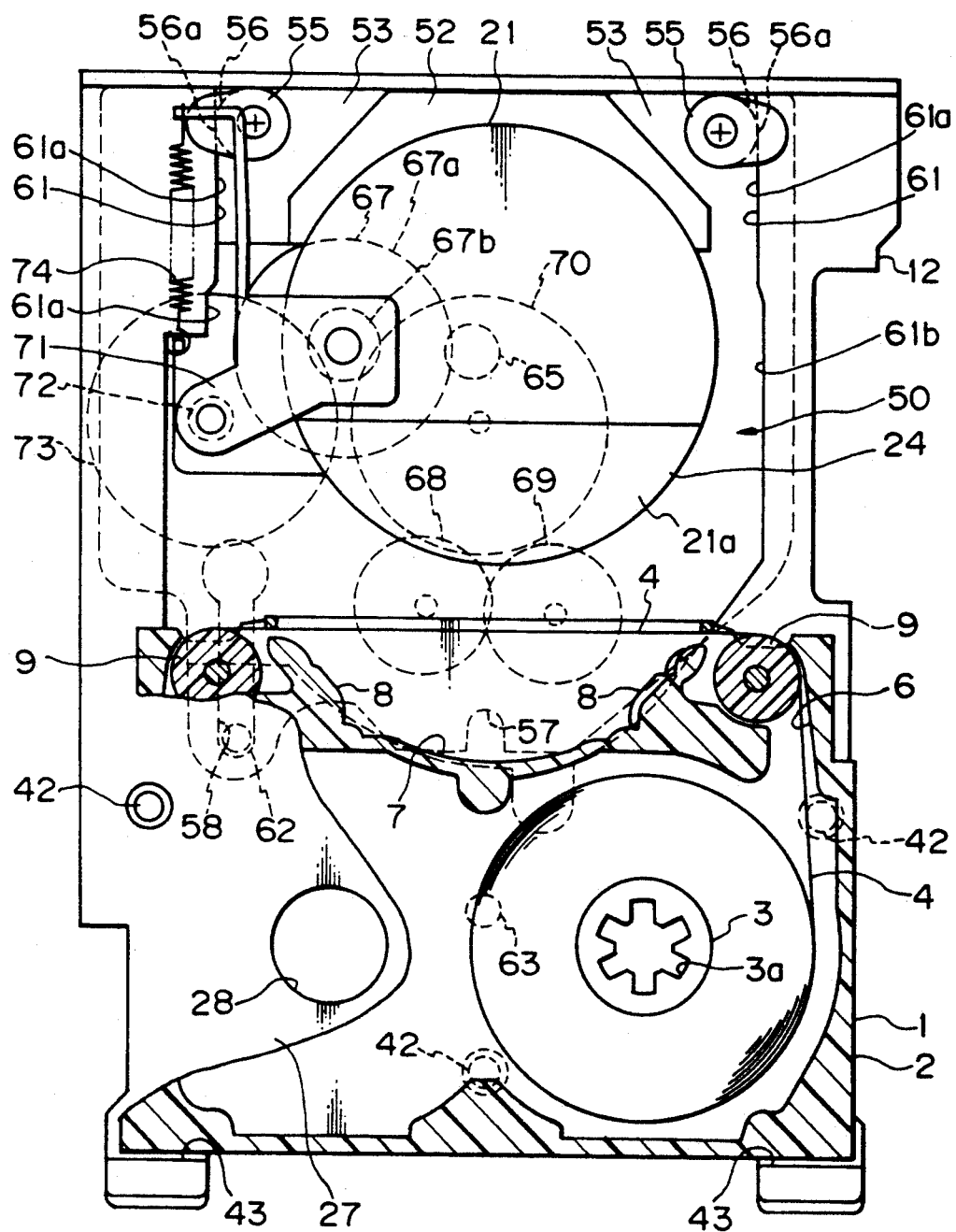
FIG. 9 is another view similar to that of FIG. 7, but with the head drum at still another position where it is fully withdrawn from the tape cassette for permitting loading and unloading of the latter.

As hereinafter described in greater detail, the head drum assembly 21 is movable between a position shown on FIG. 7 and at which most of the front portion 21a of the head drum assembly is inserted into the cavity C of an operatively positioned tape cassette 1; a position in which the forward portion 21a of the head drum assembly 21 is only slightly inserted into the cavity C of the operatively positioned tape cassette 1, as shown in FIG. 8; and still another position in which the head drum assembly 21 is completely withdrawn from the operatively positioned tape cassette 1, as shown in FIG. 9.

When the head drum assembly 21 is moved to the position shown in FIG. 7, the forward portion 21a of the head drum assembly, in entering the cavity C of the tape cassette 1, displaces the run 4a of the tape 4 extending between the pinch rollers 9 and, as a consequence of such displacement, the run 4a of the tape is wrapped around a predetermined angular extent of the peripheral surface of the head drum assembly. With the head drum assembly 21 positioned as shown on FIG. 7, recording and/or reproduction of signals on the magnetic tape 4 can be executed by the rotary magnetic heads 23.

When the head drum assembly 21 is moved to the position shown on FIG. 8, the forward portion 21a of the head drum assembly only slightly deflects the tape run 4a from its normal straight path between the pitch rollers 9 with the result that the magnetic tape 4 is wrapped around the head drum assembly 21a to only a small angular extent. Therefore, in the condition shown on FIG. 8, any one of fast-forward, rewinding and searching operations of the apparatus can be selectively executed.

When the head drum assembly 21 is moved to the position shown on FIG. 9, the tape cassette 1 can be removed from the operative position thereshown, or installed in such operative position, without interference from the head drum assembly.

The forward portion 27 of the sub-chassis 12 constitutes a cassette loading portion of the apparatus and is formed with laterally spaced apart holes 28 through which the reel engaging shafts 16 and 16' project upwardly from the main chassis 11. A gear transmission assembly is provided on the main chassis 11 under the cassette loading portion 27 and includes a play gear 30 rotatably mounted on a shaft 31 which is supported by one end portion of a play gear arm 29 having its other end rotatably mounted on the lower portion of a supporting shaft 14a of the reel base 14. The play gear 30 includes a relatively large diameter gear 30a formed integrally with a relatively small diameter gear 30b which is always in meshing engagement with the reel base gear 15 of the reel base 14. A lower end portion of the shaft 31 supporting the play gear 30 extends downwardly below the main chassis 11 through an elongated arcuate hole 32 in the latter (FIG. 14) dimensioned to suitably limit the angular displacements of the arm 29 about the axis of the shaft 14a. A tension spring 33 (FIGS. 6 and 14) extends between the play gear arm 29 and the main chassis 11 for urging the arm 29 in the counter-clockwise direction, as viewed from above, to the position shown on FIG. 14.

A fast-forward gear arm 34 is pivotally mounted, intermediate its ends, on the supporting shaft 14a. A fast-forward gear 35 is rotatably mounted on the rear end portion of the arm 34 and is continuously in meshing engagement with a relatively smaller gear 15a disposed under the reel base gear 15 and being integral with the latter. An obliquely extending cam edge 36 (FIGS. 6 and 14) is formed on the forwardly directed portion of the fast-forward gear arm 34. A tension spring 37 is connected between the forward end portion of the fast-forward gear arm 34 and the main chassis 11 so as to urge the arm 34 in the clockwise direction, as viewed from above on FIGS. 6 and 14.

A rewind gear arm 38 is pivotally mounted intermediate its ends on a supporting shaft 13a of the reel base 13 (FIG. 6). A rewind gear 39 is rotatably mounted on a rear end portion of the arm 38 and is in continuous meshing engagement with the reel base gear 15' of the reel base 13. An obliquely extending cam edge 40 is formed on the front end portion of the rewind gear arm 38, and a tension spring 41 is connected between the front end of the rewind gear arm 38 and the main chassis 11 for urging the rewind gear arm 38 to turn in the counter-clockwise direction, as viewed on FIG. 6.

As hereinafter described in detail, the arms 34 and 38 are selectively angularly displaced for establishing a fast-forward mode, a search mode and a rewind mode in which the reel bases 13 and 14 are rotatably driven at a high speed.

Returning to FIG. 4, it will be seen that the cassette loading portion 27 of the sub-chassis 12 has cassette supporting pins 42 directly upwardly therefrom at the middle of the forward edge of the sub-chassis 12 and at locations spaced rearwardly therefrom adjacent the opposite side edges of the sub-chassis. The tape cassette 1 is adapted to have its casing 2 positioned on the upper end surfaces of the cassette supporting pins 42 for vertically locating the tape cassette 1 in an operative position of the latter. Locating members 43 are bent upwardly from the front edge of the sub-chassis 12 adjacent the opposite sides of the latter and are engageable with the casing 2 of a tape cassette 1 mounted on the cassette supporting pins 42 for locating such tape cassette 1 in the forward and rearward direction in its operative position. It will be appreciated that, in such operative position, the open front side of the cassette casing 2 faces rearwardly with reference to the forward and rearward directions of the tape recording and/or reproducing apparatus, from which it follows that the locating members 43 at the front end of the sub-chassis 12 are engageable with the peripheral wall of the cassette casing 2 at the backside of the latter.

The tape recording and/or reproducing apparatus embodying this invention is further shown to comprise a cassette holder 44 having a generally box-like cassette holding portion 45 which is open at the front and back thereof and dimensioned for slidably receiving the tape cassette 1, and which has arms 46 directed rearwardly from the opposite side walls of the cassette holding portion 45. The inwardly directed surfaces of the arms 46 have arcuate flanges 47 projecting therefrom and curving upwardly and rearwardly from the lower edges of the respective arms 46. Such flanges 47 function to open the lid 10 of a tape cassette 1 when the latter is inserted rearwardly into the cassette holding portion 45 with the lid 10 at the leading side of the inserted cassette, as hereinafter described in detail.

The arms 46 have laterally aligned holes 46a in their free end portions for receiving pivot pins 46b on mounting brackets 48 and 49 which extend upwardly from the opposite sides of the main chassis 11. Thus, the cassette holder 44 is mounted on the main chassis 11 for angular movements between an upwardly inclined cassette receiving and ejecting position shown in FIG. 10 and a horizontal loading position shown in FIG. 11. As shown on FIG. 4, the bottom wall of the cassette holding portion 45 is formed with a central cutout 45a adjacent its forward edge portion, and with a pair of laterally spaced apart circular openings 45b.

Figure 12A:
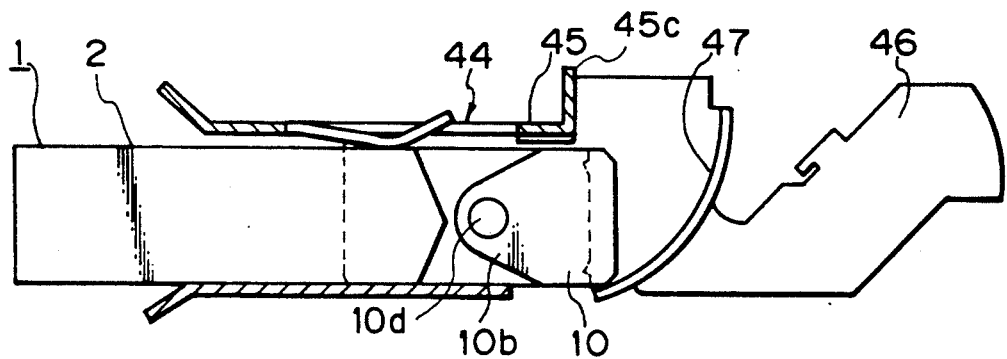
FIGS. 12A-12F are side elevational views, partly broken away and in section, of the cassette holder, and which show successive stages in the opening of the lid of a tape cassette in response to the insertion of the latter into the cassette holder and the closing of the lid in response to the ejection of the tape cassette from the holder.
Figure 12B:
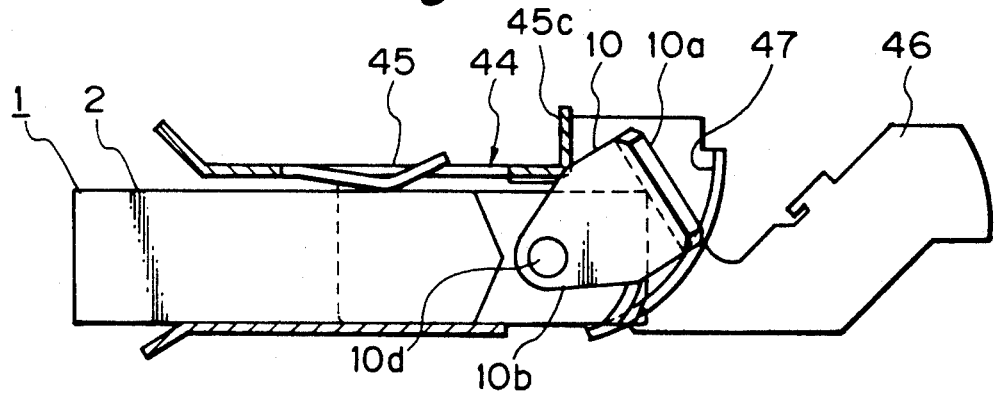
Figure 12C:
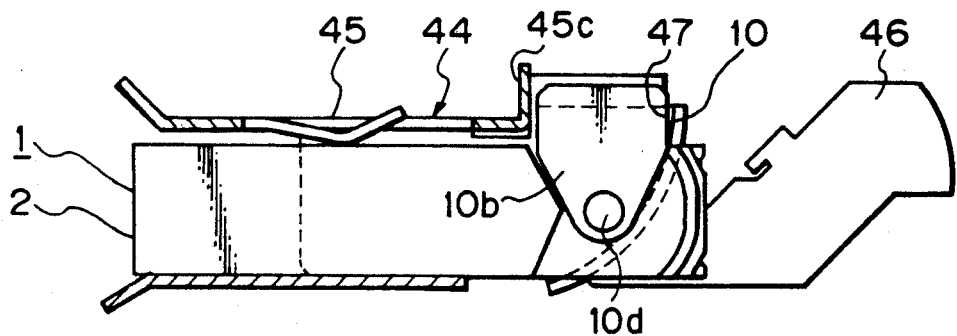

With the cassette holder 44 in its inclined cassette receiving and ejecting position (FIG. 10) the tape cassette 1 is slidably inserted downwardly and rearwardly into the cassette holding portion 45 with the lid 10 at the leading side of the cassette casing 2 so that the lid 10 comes into contact with the lid opening flanges 47 extending from the arms 46, as shown on FIG. 12A. As the tape cassette 1 is further inserted into the cassette holding portion 45, the arcuate flanges 47 act on the lid 10 and pivot the latter upwardly about the pins 10d to its open position, as shown on FIGS. 12B and 12C. In such opened position, the lid 10 is securely held between the flanges 47, at the back, and an upwardly directed flange 45c extending along the back edge of the top wall of the cassette holding portion 45.

Figure 12D:
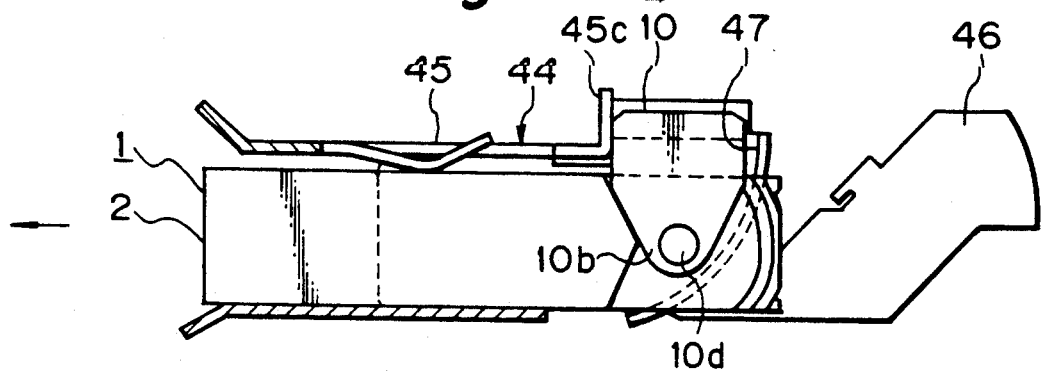
Figure 12E:
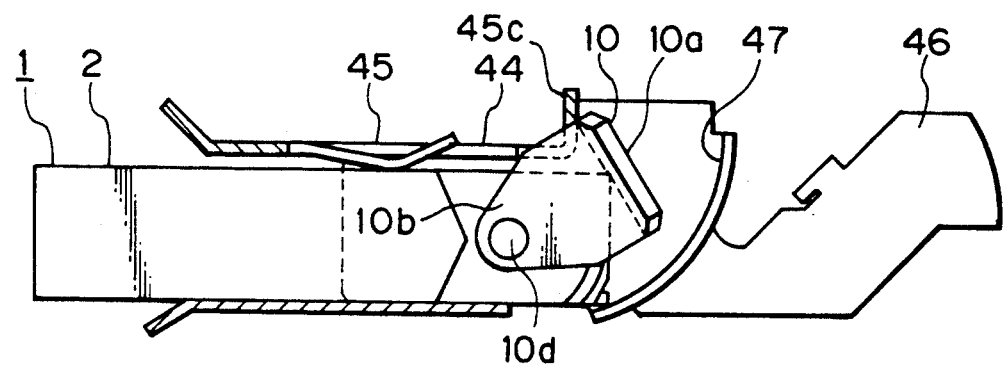
Figure 12F:
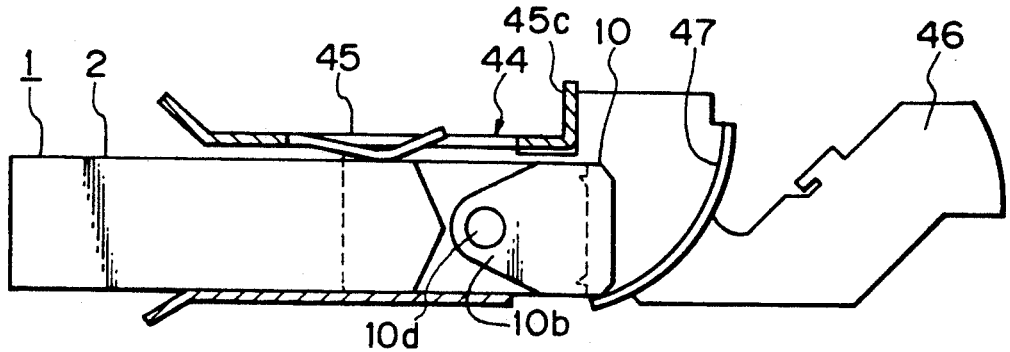

On the other hand, if a tape cassette 1 is extracted forwardly from the cassette holder 44 with the latter being disposed in its inclined cassette receiving and ejecting position (FIG. 10), the flange 45c located in front of the lid 10 in its opened positioned acts to pivot the lid downwardly to its closed position in response to the withdrawal of the tape cassette 1 from the cassette holder 44, as shown on FIGS. 12D-12F.

Figure 10:
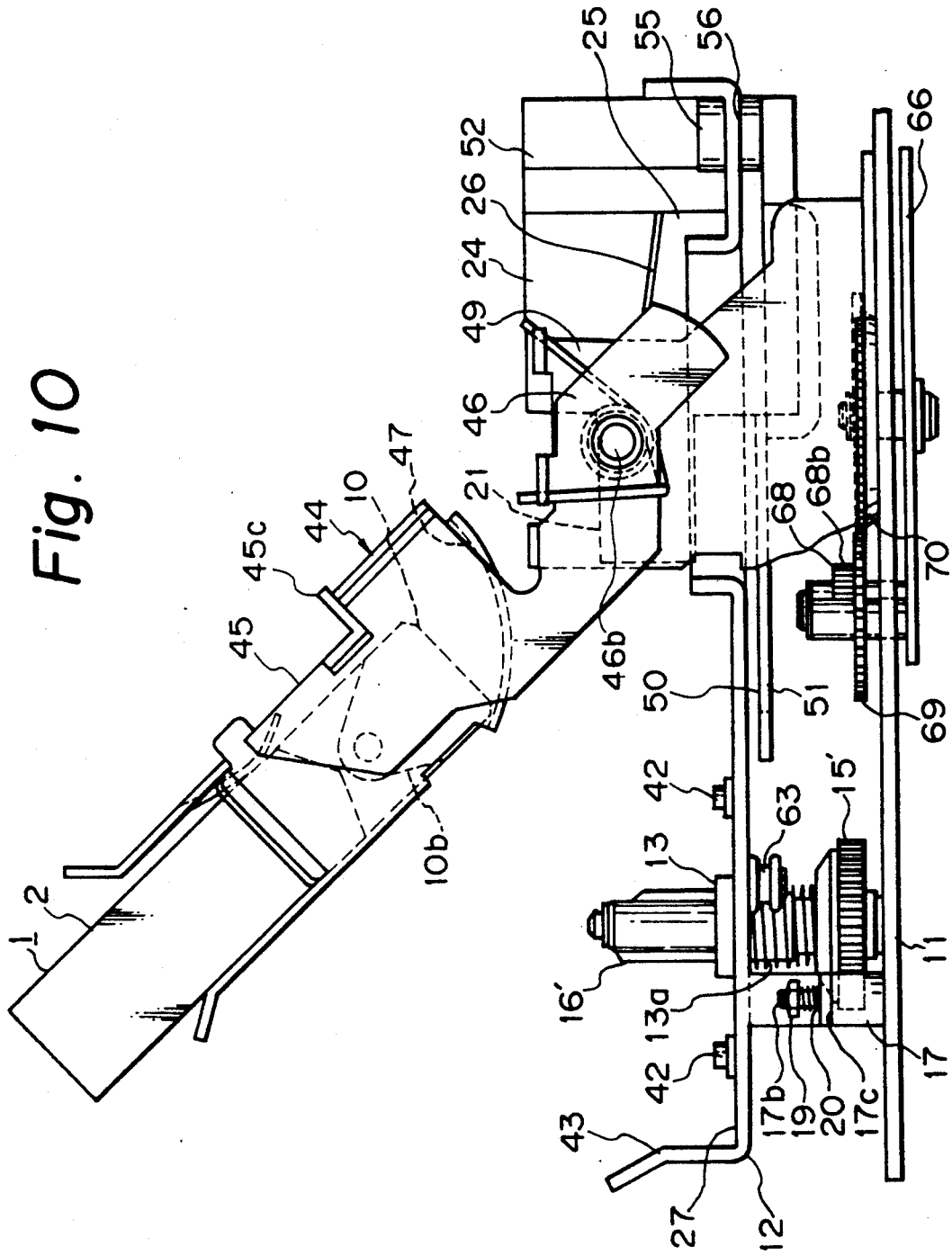
FIG. 10 is a side elevational view of a major portion of the apparatus shown on FIG. 6, but with a cassette holder thereof in a cassette-receiving and ejecting position.
Figure 11:
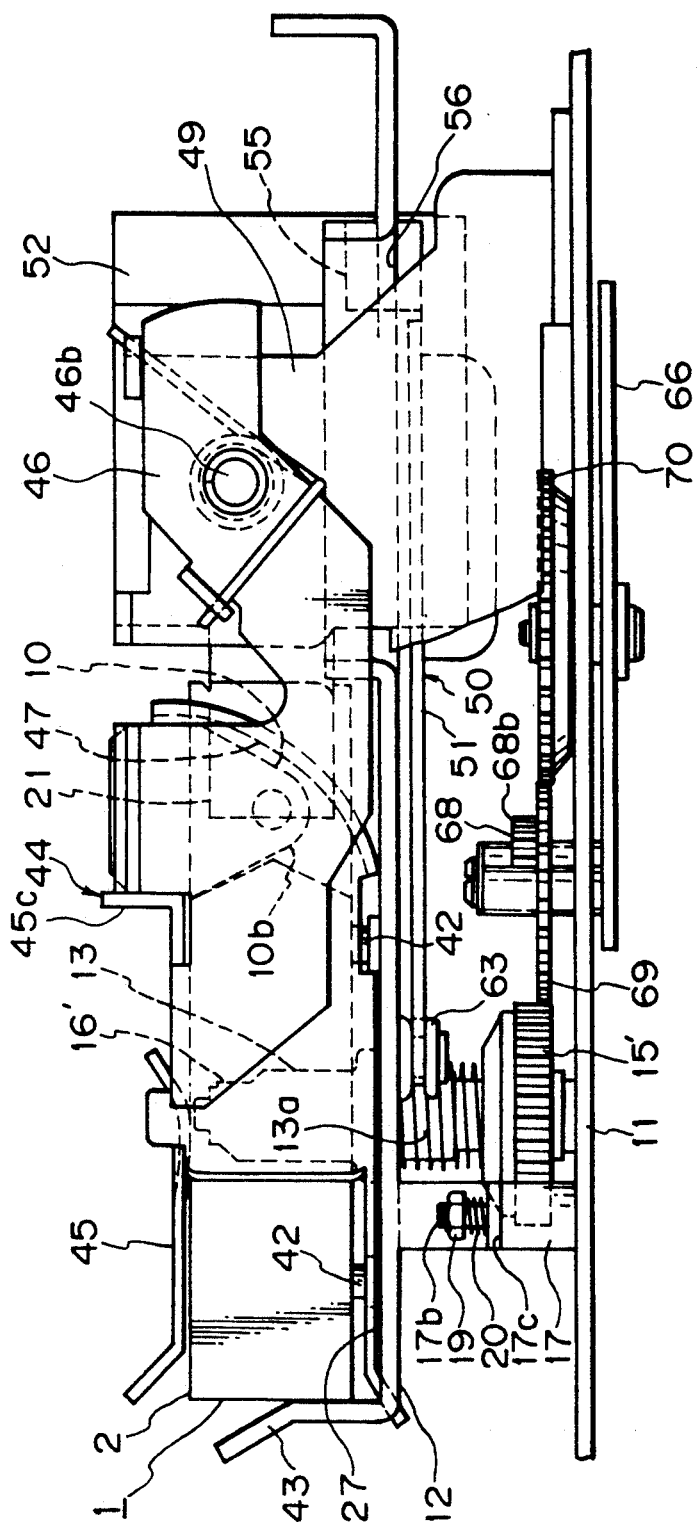
FIG. 11 is a view similar to that of FIG. 10, but showing the cassette holder in a cassette loading position thereof.

When the cassette holder 44 is angularly displaced about the pivot pins 46b from the cassette receiving and ejecting position of FIG. 10 to the horizontal loading position of FIG. 11, a tape cassette 1 disposed within the cassette holding portion 45 is thereby transported to its operative position on the cassette loading portion 27 of the sub-chassis 12. In the loading position of the cassette holder 44, the cassette supporting pin 42 at the center of the front edge of the sub-chassis 12 extends through the cutout 45a for engagement with the underside of the cassette casing adjacent the back side thereof, while the other two supporting pins 42 disposed adjacent the opposite sides of the sub-chassis 12 extend upwardly immediately in back of the bottom wall of the cassette holding portion 45 for engagement with the underside of the cassette casing 2 adjacent the open front side of the latter. Thus, the cassette casing is vertically located in its operative position by the supporting pins 42. Further, in the loading position of the cassette holder 44, the reel engaging shafts 16 and 16' of the reel bases 13 and 14 extend upwardly through the openings 45b in the bottom wall of the cassette holding portion 45 and engage in the sockets 3a of the tape reels 3 in the operatively positioned tape cassette 1.

The head drum assembly 21 is shown to be carried by a base structure 50 which comprises a base plate 51 and a supporting block 52. Coupling members 53 project laterally outward from the opposite sides of the supporting block 52 above the bottom of the latter. A large cutout 54 (FIG. 4) is formed in the base plate 51 and opens rearwardly between opposite side portions of the base plate 51 which, at their rear ends, are suitably secured to the coupling members 53 extending from the supporting block 52. Slide elements 55 are secured on top of the coupling members 53 and ar desirably formed of a synthetic resin having a low coefficient of friction. Laterally outwardly opening grooves 56 are formed in the slide elements 55.

A slit 57 elongated in the forward and rearward direction is provided at the center of the front edge of the base plate 51 and opens forwardly. A guide hole 58 is also formed in the base plate 51 and elongated in the forward and rearward direction adjacent one of the sides of the base plate 51. In the other side portion of the base plate 51 there is provided a laterally elongated hole 59 adjacent the front edge of the base plate 51.

The back half of the sub-chassis 12 is shown to be formed with a large hole or cutout 60 (FIG. 4), and such hole 60 has parallel side edges 61 extending in the forward and rearward directions and which function as guide edges for movements of the head drum assembly 21. As shown particularly on FIGS. 4 and 7, the rearmost portions 61a of the guide edges 61 project slightly inwardly toward each other relative to the guide edge portions 61b in front thereof. The lateral distance between the guide edge portions 61a is dimensioned to be approximately equal to the lateral distance between interior surfaces 56a of the grooves 56 formed in the slide elements 55. On the other hand, the lateral distance between the guide edge portions 61b is made to be slightly larger than the distance between the interior surfaces 56a of the grooves 56 in the slide elements 55.

As shown particularly on FIGS. 6-9, the guide edges 61 on the sub-chassis 12 are slidably received in the grooves 56 of the slide elements 55 included in the head base structure 50, with the base plate 51 of such structure being below the plane of the sub-chassis 12 (FIG. 10). A headed guide pin 62 depending from the sub-chassis 12 is slidably engaged in the elongated guide hole 58 in the base plate 51. Another headed guide pin 63 depends from the sub-chassis 12 and is positioned thereon to be slidably engaged in the forwardly opening slit 57 in the forward end of the base plate 51 when the head drum assembly 21 is in its foremost position shown on FIG. 7. It will be appreciated that, by reason of the slidable engagement of the slides 55 with the guide edges 61 of the sub-chassis 12 and the slidable engagement of the pin 62 in the elongated hole or slot 58 in the base plate 51, the head base structure 50 is mounted on the sub-chassis 12 for movements relative to the latter in the forward and rearward directions.

When the grooves 56 in the slide elements 55 engage the rear most guide edge portions 61a, as in FIGS. 8 and 9, such guide edge portions 61a substantially contact the interior surfaces 56a of the respective grooves 56 with the result that the head base structure 50 is held substantially immobile, in the lateral directions, relative to the sub-chassis 12. However, when the grooves 56 receive the guide edge portions 61b disposed forwardly with the respect to the guide edge portions 61a, small gaps or clearances exist between the guide edge portions 61b and the interior surfaces 56a of the grooves 56, as clearly shown on FIG. 7, so that at least the back portion of the head base structure 50 can move laterally to at least a small extent relative to the sub-chassis 12.

As shown on FIG. 13, the upper and lower drums 24 and 25 of the head drum assembly 21 are secured to and supported by the support block 52 of the head base structure 50. A fixed shaft 24b is secured at its upper end to the upper drum 24 and depends axially therefrom through a central boss 25b of the fixed lower drum 25. The fixed shaft 24b has dynamic pressure grooves 24c formed on its peripheral surface below the fixed upper drum 24 so as to provide a low friction bearing for a rotatable tubular shaft 64a of a motor 64 which is provided as an integral part of the head drum assembly 21. The rotary middle drum 22 which carries the rotary heads 23 and a rotor 64b of the motor 64 are fixed to the rotatable shaft 64a. The rotor 64b has a rotor magnet 64c secured thereto in facing relation to a stator coil 64e which is fixed within a motor housing 64d secured to the underside of the fixed lower drum 25. A back yoke 64f is disposed under the stator coil 64e and is fixed to the rotary shaft 64a so as to face the rotor 64b with the stator coil 64e therebetween. A driving gear or pinon 65 is integrally formed on a lower end portion 64'a of the rotatable shaft 64a which projects downwardly from the motor 64.

Figure 5:
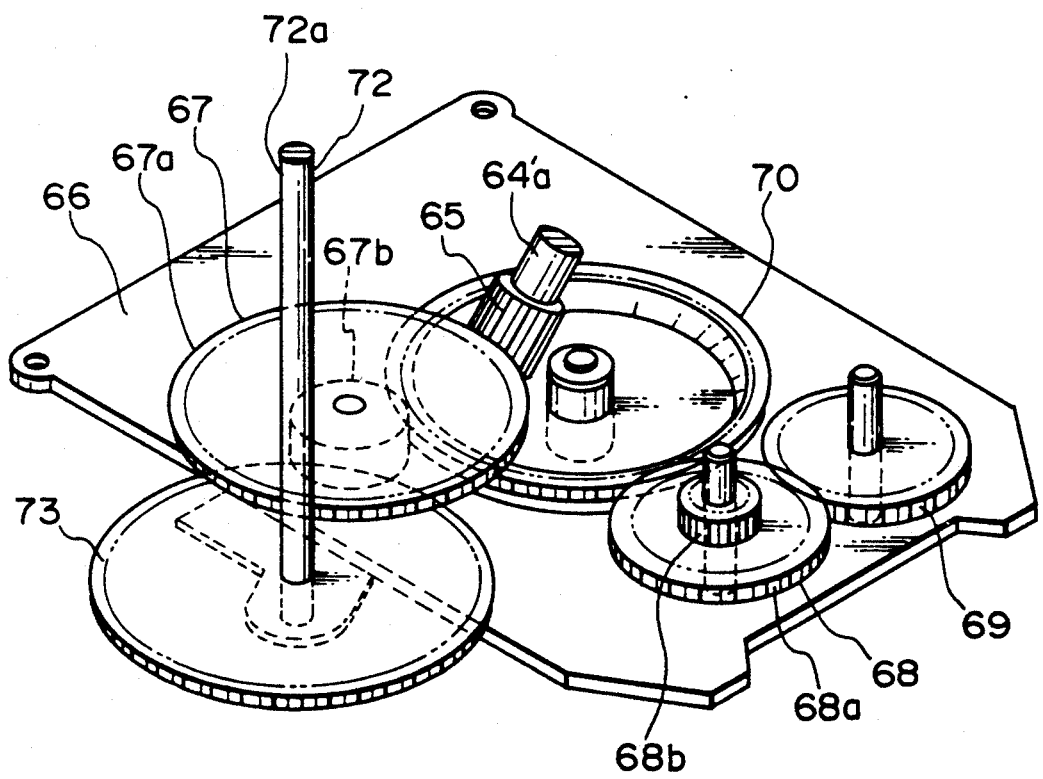
FIG. 5 is a perspective view of a portion of a gear transmission included in the apparatus of FIG. 4.

A gear base plate 66 is secured, at its back edge portion, to the bottom of the supporting block 52 of the head base structure 50 and extends forwardly therefrom below the base plate 51 (FIG. 4). A transfer gear 67 (FIGS. 5 and 13) is rotatably supported on the gear base 66 at the left hand side of the driving gear 65 as viewed from the front of the tape recording and/or reproducing apparatus. The transfer gear 67 includes, as integral parts thereof, a relatively large diameter gear 67a which is in meshing engagement with the driving gear 65, and a relatively small diameter gear 67b. Idle gears 68 and 69 which are in meshing engagement with each other, as shown particularly on FIG. 5, are rotatably mounted laterally next to each other on the forward end portion of the gear base 66. The idler gear 68 forms part of a gear transmission for the fast-forward mode, and the idler gear 69 forms part of a gear transmission for the rewind mode. The idler gear 68 for the fast-forward mode includes a relatively large gear 68a which meshes with the gear 69, and a relatively small diameter gear 68b which is integral with the large gear 68a. The large gear 68a of the idler 68 further meshes with an intermediate gear 70 which is rotatably supported on the gear base 66 (FIG. 5) and which is driven by the small gear 67b of the transfer gear 67. Therefore, when the drum motor 64 is operated, the two idler gears 68 and 69 are rotated in opposite directions, that is, the idler gear 68 for the fast-forward mode is rotated in the counterclockwise direction and the idler gear 69 for the rewind mode is rotated in the clockwise direction, as viewed from above.

A capstan support bracket 71 is pivotally mounted on the gear base 66 and the upper drum 24, as at 71a (FIG. 6), for turning about an axis which is coaxial with the axis of rotation of the transfer gear 67. A capstan 72 is rotatably mounted in the bracket 71 with its axis in parallel spaced relation to the pivoting axis of the bracket 71. A capstan gear 73 (FIG. 5) is secured to a shaft 72a which is a downward extension of the capstan 72. The capstan gear 73 meshes with the relatively small diameter gear 67b of the transfer gear 67 so that the capstan 72 is rotated whenever the motor 64 is operated. A tension spring 74 is connected between an arm 71b extending from the capstan support bracket 71 and the base structure 50 (FIGS. 6 and 7) so as to urge the capstan support bracket 71 to turn in the counter-clockwise direction about the axis 71a, as viewed from above on FIGS. 6 and 7.

When the base structure 50 is moved forwardly to its foremost position (FIG. 7), the ridges 24a and 25a on the head drums 24 and 25 are pressed against the locating surfaces 8 within the cavity C of the tape cassette and, at such time, the engagement of the grooves 56 of the slide elements 55 with the guide edge portions 61b permits small lateral displacements of the drum assembly 21 for ensuring accurate positioning of the latter in respect to the cassette casing 2 and the tape 4 therein.

During the movement of the head drum assembly 21 to its foremost position shown in FIG. 7, the capstan 72 comes into contact through the magnetic tape 4 with the pinch roller 9 at the side portion of the cassette casing 2 which houses the tape reel engaged by the shaft 16 of the take-up reel base 14. Actually, the initial engagement of the capstan 72 with the adjacent pinch roller 9 occurs prior to the arrival of the head drum assembly 21 at its foremost position so that, during the final increment of movement of the head drum assembly to such foremost position, the capstan 72 is moved slightly in the rearward direction relative to the head drum assembly 21 and the tension spring 74 yieldably resists such movement and is tensioned. Therefore, in the foremost position of the head drum assembly 21 shown on FIG. 7, the tensioned spring 74 urges the capstan 72 against the adjacent pitch roller 9 with the tape therebetween.

Figure 14:
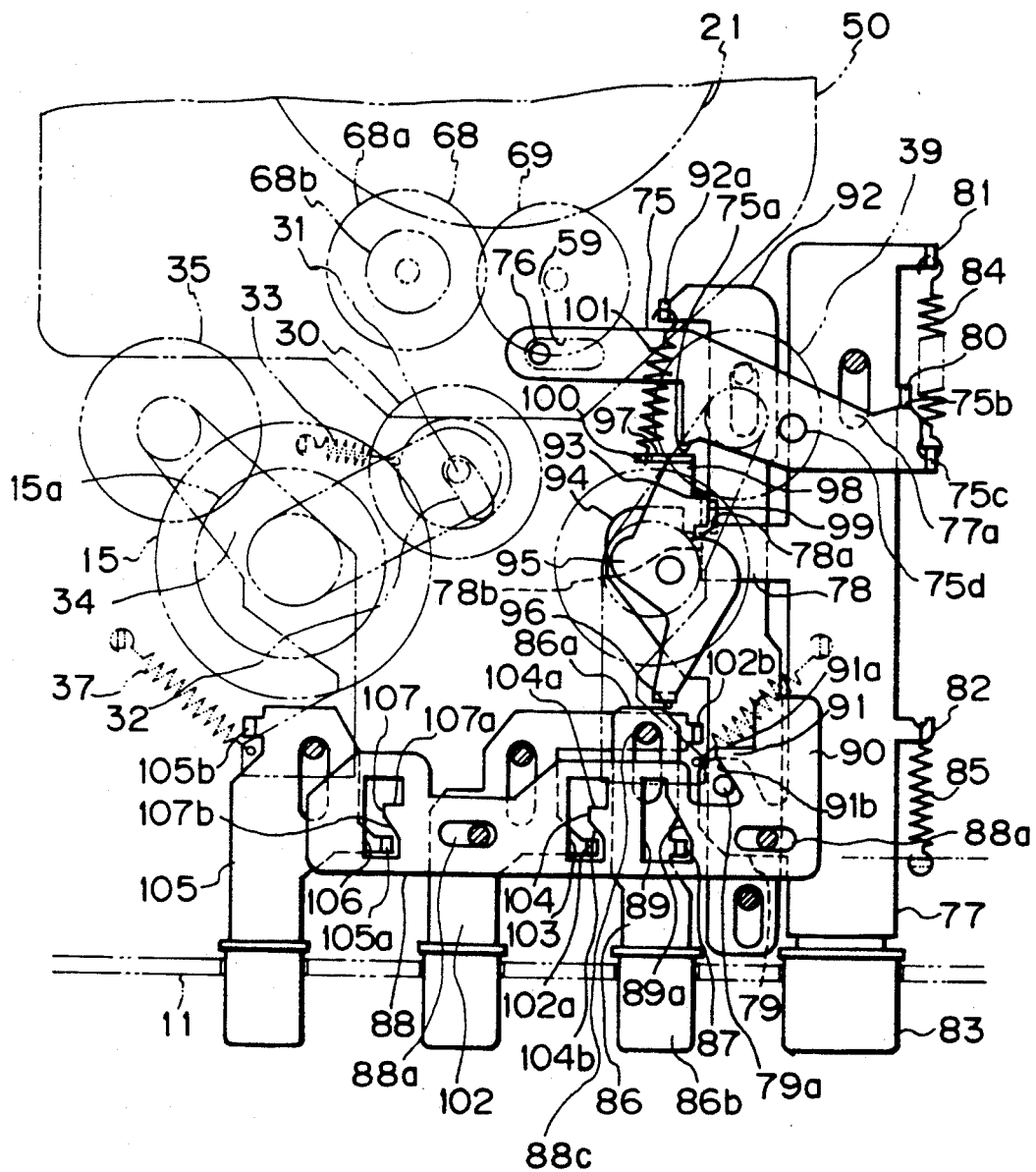
FIG. 14 is a plan view of a mode selecting mechanism in a non-actuated or rest condition.

Referring now to FIG. 14, it will be seen that a mode selecting mechanism of a tape recording and/or reproducing apparatus according to an embodiment of this invention includes a laterally elongated drum displacing lever 75 pivotally mounted intermediate its ends, as at 75d, on the main chassis 11. A coupling pin 76 projects from the left-hand end of the lever 75, as viewed on FIG. 14, and slidably engages in the laterally elongated hole 59 of the base plate 51. Therefore, when the lever 75 is pivotally displaced, the engagement of the coupling pin 76 in the elongated hole 59 causes movement of the base structure 50, and hence of the head drum assembly 21, in the forward and rearward directions. A bearing portion 75a is formed at the front edge of the lever 75 to the left of the pivot 75d, and a stop portion 75b is formed at the back edge of the lever 75 at the right-hand side of the pivot 75d. A spring anchor 75c extends from the right-hand end of the lever 75.

A play slide member 77 is supported on the main chassis 11, as by a pin and slot connection 77a, so as to be slidable in the forward and rearward directions relative to the main chassis. A laterally directed arm 78 projects toward the left from an intermediate portion of the slide member 77 and has an oblique corner 78a at the back end of its outer edge 78b. The slide member 77 is further formed with an arm 79 directed laterally toward the left from its forward end portion and which carries an upstanding locking pin 79a. A lug 80 is directed upwardly from the right-hand edge of the slide member 77 adjacent its rear portion and is engageable by the stop portion 75b of the lever 75. A spring anchor 81 is provided at the back end of the slide member 77, and a tension spring 84 is connected, at its opposite ends, to the spring anchors 75c and 81 so as to yieldably hold the stop portion 75b of lever 75 against the lug 80 of the slide member 77. Another spring anchor 82 extends from the right-hand edge of the slide member 77 adjacent the forward portion of the latter and a tension spring 85 is connected between the anchor 82 and the main chassis 11 for urging the slide member 77 forwardly to its non-actuated or rest position shown on FIG. 14. A push-button 83 is attached to the front end of the slide member 77 and can be manually depressed for moving the slide member 77 rearwardly against the force of the spring 85 from the rest position shown on FIG. 14.

It will be seen that, in the rest position of the slide member 77, the lever 75 is angularly disposed so as to locate the head drum assembly 21 in the position shown on FIG. 8. When the slide member 77 is depressed, as shown on FIG. 15, the spring 84 urges the right-hand end portion of the lever 75 to move rearwardly with the slide member 77 so that the lever 75 is turned in the counter-clockwise direction, as viewed from above, and the engagement of the coupling pin 76 in the slot 59 causes movement of the head drum assembly 21 to its foremost position shown on FIG. 7. As hereinafter described in detail, after the slide member 77 is depressed rearwardly to the position shown on FIG. 15, a locking assembly is operative to secure the slide member 77 in such depressed position, and hence to hold the head drum assembly 21 in its foremost position, until the locking assembly is released.

A stop/eject slide member 86 is disposed to the left of the play slide member 77 and is similarly mounted on the main chassis 11, as by a pin and slot connection 86c, for movements in the forward and rearward direction. A bearing projection 87 is directed upwardly from the right-hand side of the slide member 86 intermediate the ends of the latter, and a suitable spring (not shown) acts forwardly on the slide member 86 for urging the latter forwardly to its non-actuated or rest position shown on FIG. 14. A push-button 86b is provided on the front end of the slide member 86 for use in manually depressing the latter. A laterally elongated locking plate 88 is mounted on the forward portion of the main chassis 11, as by pin-in-slot connections 88a (FIG. 14) so as to permit lateral movements of the plate 88 relative to the main chassis. A spring (not shown) suitably acts on the locking plate 88 for yieldably urging the latter toward the left, as viewed on FIG. 14. A cam hole 89 is formed in the locking plate 88 above the slide member 86 to receive the bearing projection 87, and the cam hole 89 has an oblique edge 89a urged against the bearing projection 87 by the spring force acting toward the left on the locking plate 88 as viewed on FIG. 14.

Figure 16:
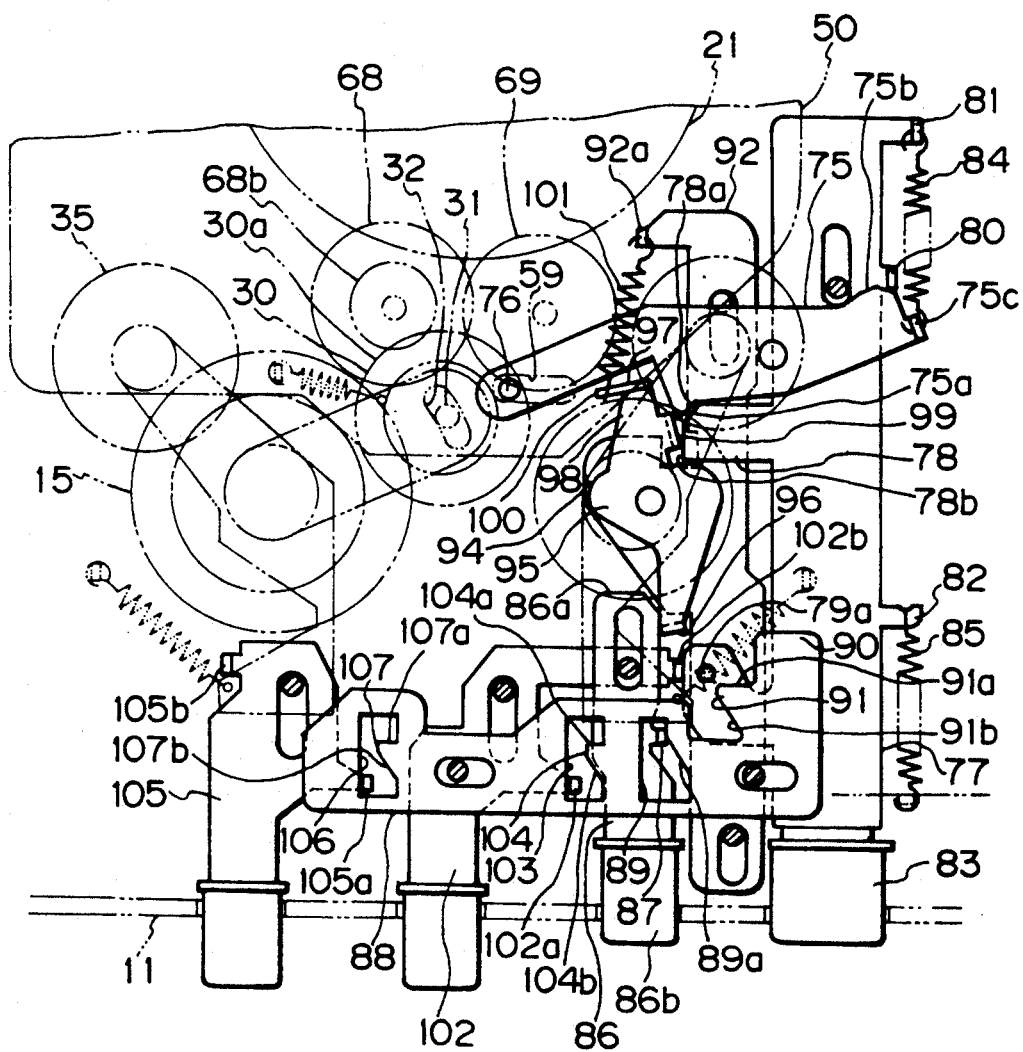
FIG. 16 is a view similar to that of FIG. 15, but showing the condition of the mode selecting mechanism upon actuation of a stop/eject push button during a recording or reproducing operation.

When the stop/eject slide member 86 is rearwardly depressed, for example, to the position shown on FIG. 16, the bearing projection 87 thereon acts against the oblique edge 89a of the locking plate 88 so that the latter is moved toward the right against the force of the previously mentioned spring. When the stop/eject slide member 86 is returned forwardly to its original or rest position by the spring acting forwardly thereon, the locking plate 88 is returned toward the left by the combination of the spring forces applied forwardly to the slide member 86 and toward the left on the locking plate 88, respectively.

At its right-hand end, the locking plate 88 is formed with a rearwardly directed projection 90 which, at its left hand side, is formed with a locking nose 91 having a laterally directed rear edge 91a and an oblique side edge 91b for cooperation with the locking pin 79a on the slide member 77.

When the play slide member 77 is located in its non-actuated or rest position shown in FIG. 14, the pin 79a is in contact with the forward portion of the oblique edge 91b of the locking nose 91 on the plate 88. When the play slide member 77 is depressed rearwardly, the pin 79a rides against the oblique edge 91b so as to displace the locking plate 88 toward the right. When the play slide member 77 has attained its fully depressed position shown on FIG. 15, the pin 79a is rearwardly removed from the edge 91b so that the locking plate 88 can be moved toward the left by the spring force acting thereon and thereby engage the lateral edge 91a of the nose 91 with the locking pin 79a therebehind. Therefore, upon removal from the play slide member 77 of the force applied thereto for rearwardly depressing the same, the engagement of the pin 79a with the edge 91a serves to lock the play slide member 77 in its depressed position.

If the stop/eject slide member 86 is depressed with the play slide member 77 locked in its depressed position, for example, as in FIG. 16, the rearward movement of the bearing projection 87 along the cam edge 89a of the hole 89 causes movement of the locking plate 88 toward the right with the result that the edge 91a of the locking nose is withdrawn from in front of the locking pin 79a. Therefore, the play slide member 77 is free to be returned forwardly to its rest position by the force of the spring 85.

A supporting slide member 92 is suitably mounted on the main chassis 11 between the slide members 77 and 86 for movements in the forward and rearward directions. The supporting slide member 82 is urged forwardly to the position shown on FIG. 14 by a spring (not shown). A stopper edge 93 is provided at the left-hand side of the slide member 92 at a location there along which is slightly beyond the middle toward the back end of the slide member 92. At about the middle of the supporting slide member 92, that is, slightly in front of the stopper edge 93, the slide member 92 has a supporting portion 94 projecting therefrom toward the left. A coupling lever 95 is pivotally mounted, at its central portion, on a pivot 95a carried by the supporting portion 94 of slide member 92. The coupling lever 95 extends substantially in the front to rear direction and has bearing members 96 and 97 directed downwardly and upwardly, respectively, at the front and rear ends of the lever 95. Further, the rearwardly directed arm 98 of the lever 95 has a downwardly directed restricting flange 99 approximately at the middle of its right-hand edge. The bearing member 97 at the rear end of the lever 95 terminates in an anchor 100, and a tension spring 101 is connected between the anchor 100 and a spring anchor 92a provided on the back end portion of the slide member 92. The spring 101 acts to urge the coupling lever 95 in the clockwise direction, as viewed from above, so to normally engage the restricting flange 99 thereon with the stopper edge 93 on the left hand side of the supporting slide member 92 whereby the lever 95 is disposed in its so-called coupling position extending substantially front to rear, as shown on FIG. 14. If the supporting slide member 92 is in its forward position, as on FIG. 14, and the coupling lever 95 is in the described coupling position thereof, the oblique corner 78a of the non-actuated play slide member 77 comes into contact with the front edge of the restricting flange 99 from the right side of the latter (FIG. 14). When the play slide member 77 is depressed with the other elements of the mode selecting mechanism positioned as described above and shown in FIG. 14, the oblique corner 78a on the arm 78 of slide member 77 bears rearwardly and toward the left against the flange 99 on the coupling lever 95 so as to angularly displace the latter counter-clockwise against the tension of spring 101, as shown on FIG. 15. As the rearward movement of the slide member 77 continues, the outer edge 78b of the projection 78 on the slide member 77 comes into contact with the flange 99 so as to hold the coupling lever 95 in its non-coupling or disengaged position shown on FIG. 15.

In such disengaged position of the lever 95, the bearing member 96 at its forward end is deflected toward the right out of the path of movement of a bearing edge 86a at the back end of the stop/eject slide member 86. Further, in the disengaged position of the lever 95, the bearing member 97 at its rear end is deflected toward the left away from the path of movement of the bearing portion 75a of the lever 75.

Thus, the drum displacing lever 75 is free to be turned in the counter-clockwise direction by the force of the spring 84 in response to the depressing or rearward movement of the play slide member 77 with the result that the engagement of the pin 76 in the lateral slot 59 is effective to move the head drum assembly 21 forwardly to its foremost position shown in FIG. 7 for establishing the recording and/or reproducing mode of the apparatus. When the stop/eject slide member 86 is depressed with the apparatus in its recording and/or reproducing mode, the bearing edge 86a at the back end of the slide member 86 is not engagable with the bearing member 96 at the forward end of the coupling lever 95 in its disengaged position, as shown on FIG. 16. In response to depressing of the slide member 86, the bearing projection 87 thereon cooperates with the cam edge 89a for displacing the locking plate 88 toward the right and thereby releasing the locking pin 79a from the nose 91 for permitting the spring-urged return of the play slide member 77 to its rest position. During such return of the play slide member 77 to its rest position, the head drum assembly 21 is returned rearwardly to the position shown on FIG. 8 and, upon release of the stop/eject slide member 86, the coupling lever 95 is returned to its coupling position shown on FIG. 14. In such coupling position, the bearing member 96 at the front end of the lever 95 confronts the bearing edge 86a at the back end of the slide member 86, and the bearing member 97 at the back end of the coupling lever 95 confronts the bearing portion 75a of the lever 75.

Figure 17:
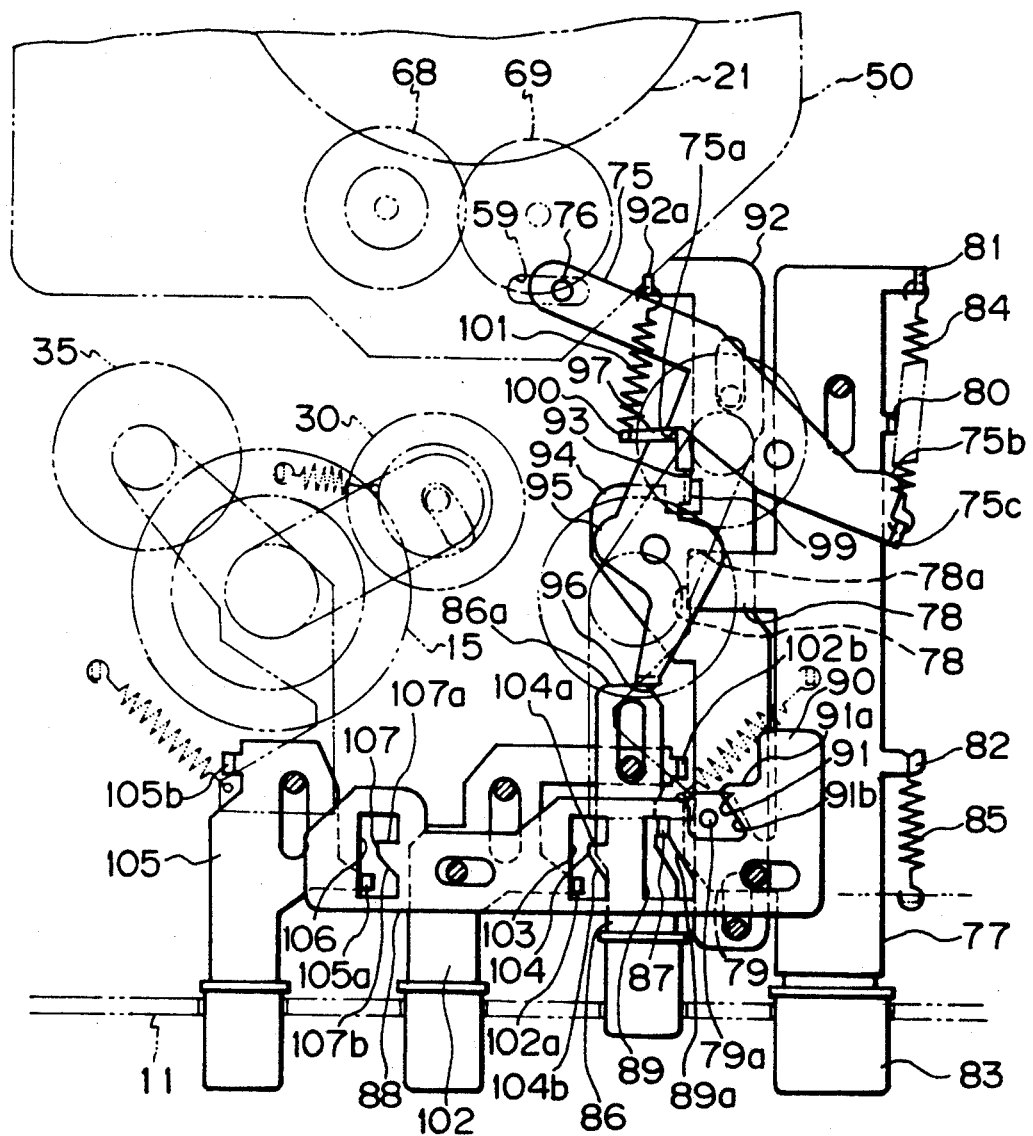
FIG. 17 is a view similar to that of FIG. 16, but showing the condition of the mode selecting mechanism upon ejection of a tape cassette.

If the stop/eject slide member 86 is depressed while the play slide member 77 is in its non-actuated or rest position, for example, as on FIG. 17, the bearing edge 86a at the back end of the slide member 86 acts rearwardly against the bearing member 96 at the forward end of the coupling lever 95 in its junction position. Thus, the coupling lever 95 is bodily moved rearwardly to effect similar movement of the supporting slide member 92 on which the lever 95 is mounted. Further, during such bodily movement of the coupling lever 95 in the rearward direction, its bearing member 97 acts against the bearing portion 75a of the lever 75 so as to turn the latter in the clockwise direction, as viewed on FIG. 17, against the force of the spring 84. As a result of such clockwise turning of the lever 75, the head drum assembly 21 is moved rearwardly to the position shown on FIG. 9 so as to be completely withdrawn from the operatively positioned tape cassette 1.

Upon such movement of the head drum assembly 21 to the position shown on FIG. 9, a locking device (not shown), which may be provided for holding the cassette holder 44 in its loading position, is suitably released and the cassette holder 44 is spring urged to its cassette receiving and ejecting position, for example, by a torsion spring 44a arranged around one of the pivots 46b (FIG. 10). On the other hand, when the cassette holder 44 has attained its cassette receiving and ejecting position, the base structure 50 may be suitably locked so as to hold the head drum assembly 21 in the position shown on FIG. 9 until such time as the cassette holder 44 is again returned to its loading position. Such locking of the base structure 50 in the position corresponding to the rearmost position of the head drum assembly 21 shown on FIG. 9 can be achieved by various devices, such as, for example, by providing the locking plate 88 with a locking element for holding the stop/eject slide member 86 in the depressed position of FIG. 17 until such time as a cam (not shown) interlocked with the cassette holder 44 is effective to move the locking plate 88 in its releasing or unlocking direction in response to the movement of the cassette holder 44 to its loading position.

A rewind slide member 102 is supported on the main chassis 11 to the left of the stop/eject slide member 86 so as to be also slidable in the front to rear direction relative to the main chassis. The rewind slide member 102 is urged forwardly by a spring (not shown) to a non-actuated or rest position shown on each of FIGS. 14–17. A locking element 102a is provided on the slide member 102 and extends upwardly into an opening 103 which is elongated in the front-to-rear direction and is formed in the locking plate 88. A locking nose 104 extends into the opening 103 from the right-hand edge thereof and has a laterally directed rear edge 104a and an oblique side edge 104b.

When the rewind slide member 102 is in its rest position shown on FIG. 14, the locking element 102a is situated in the forward portion of the opening 103 and faces the forward portion of the oblique side edge 104b of the locking nose 104. When the rewind slide member 102 is rearwardly depressed, as in FIG. 18, the locking element 102a acts against the oblique side edge 104b of the locking nose 104 and thereby displaces the locking plate 88 toward the right until the rewind slide member 102 has attained its fully depressed position. In such fully depressed position of the slide member 102, the locking element 102a is removed from the edge 104b so as to permit the locking plate 88 to be returned in the leftward direction by the spring acting thereon, whereby the rearwardly directed lateral edge 104a of the nose 104 is located in front of the locking element 102a for maintaining the rewind slide member 102 in its depressed condition even when the manually applied force for depressing the slide member 102 has been removed therefrom.

A bearing member 102b extends from the back end portion of the rewind slide member 102 and, in the rest position of the slide member 102, the bearing member 102b engages the cam edge 40 on the rewind gear arm 38 so as to hold the latter in the position shown on FIGS. 14–17 against the force of the spring 41. However, when the rewind slide member 102 is depressed rearwardly, the bearing member 102b is moved rearwardly away from the cam edge 40 so that the spring 41 can then effect counter-clockwise turning of the rewind gear arm 38 for effecting meshing engagement of the rewind gear 39 with the idler gear 69. On the other hand, when the rewind slide member 102 is returned forwardly from its depressed position to its rest position shown on FIG. 14, the forwardly moving bearing member 102b acts against the cam edge 40 of the rewind gear arm 38 for turning the latter in the clockwise direction against the force of the spring 41 and thereby disengages the rewind gear 39 from the idler or coupling gear 69.

The mode selecting mechanism of the apparatus embodying this invention is completed by a fast-forward slide member 105 which is disposed to the left of the slide member 102 and also mounted on the main chassis 11 for movements relative thereto in the front to rear direction. The fast-forward slide member 105 is urged by a spring (not shown) to a non-depressed or rest position shown on FIG. 14 and has a locking element 105a extending upwardly in an opening 106 which is formed in the locking plate 88 and which is elongated in the front to rear direction. The opening 106 is shown to have a locking nose 107 extending therein from the right-hand side and being formed with a laterally directed back edge 107a and an oblique side edge 107b. The locking element 105a engages the forward portion of the oblique side edge 107b when the slide member 105 is in its rest position.

Figure 19:
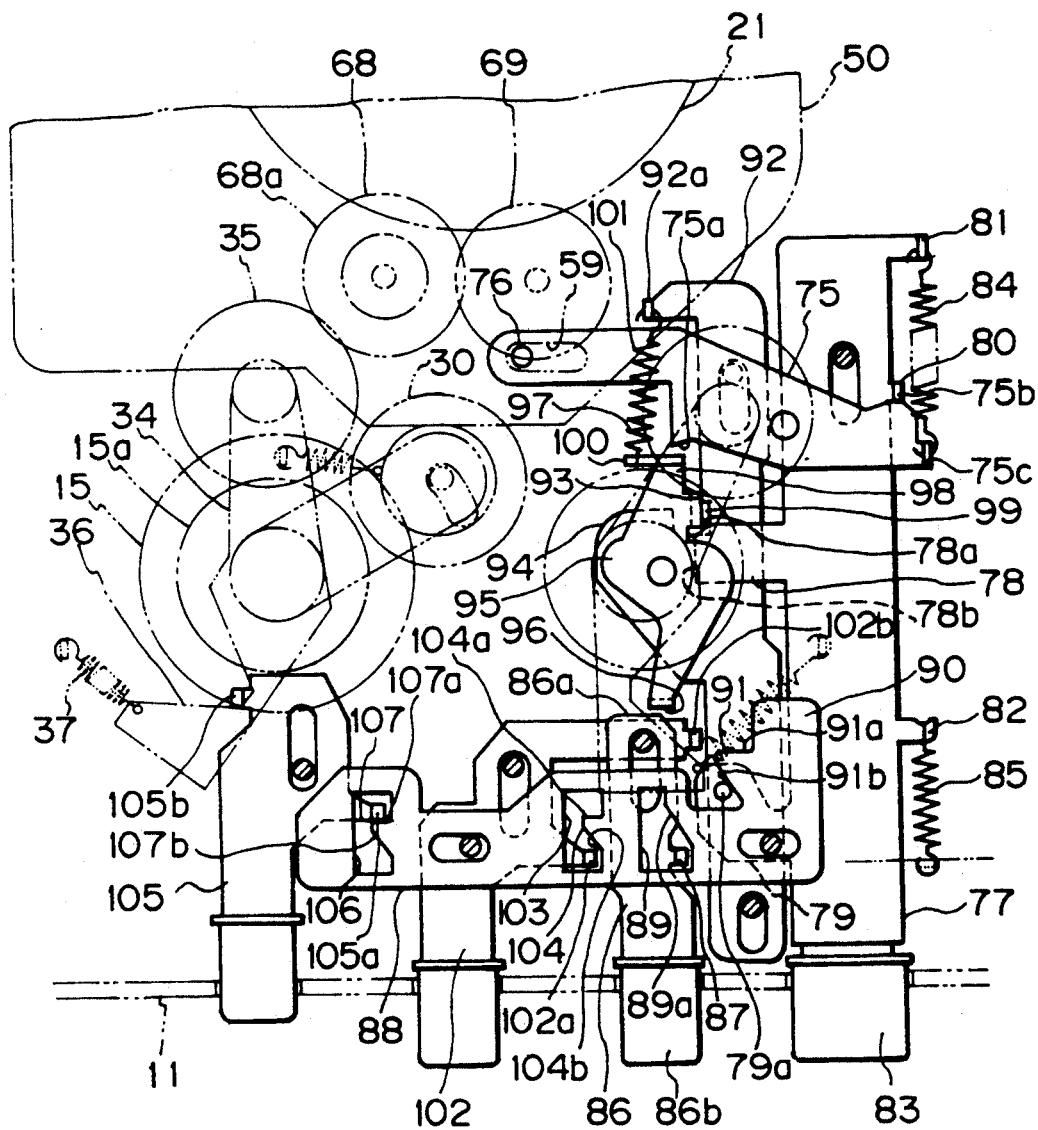
FIG. 19 is still another view similar to that of FIG. 14, but showing the condition of the mode selecting mechanism when actuated for achieving a fast-forward operation.

When fast-forward slide member 105 is depressed, locking element 105a moves rearwardly against the oblique edge 107b of locking nose 107 for displacing locking plate 88 toward the right until slide member 105 has attained its fully depressed position shown in FIG. 19. At such time, the locking element 105a is to the rear of the locking nose 107 so that the locking plate 88 can be returned toward the left by the spring acting thereon, with the result that the lateral edge 107a of the locking nose is located in front of the locking element 105a for retaining the slide member 105 in its depressed position even if the manually applied actuating force is removed therefrom.

During the movement of the fast-forward slide member 105 from its rest position to its depressed position, a bearing member 105b extending from the back end portion of the slide member 105 is moved rearwardly away from the cam edge 36 on the fast-forward gear arm 34. As a result of the foregoing, the gear arm 34 is free to be turned in the clockwise direction by the spring 37 for effecting meshing engagement of the fast-forward gear 35 with the large diameter gear 68a of the coupling or idler gear member 68. On the other hand, when the fast-forward slide member 105 is returned from its depressed position to its forward or rest position, the bearing member 105b thereon acts against the cam edge 36 on the fast forward gear arm 34 for turning the latter in the counter-clockwise direction against the force of the tension spring 37 with the result that the fast-forward gear 35 is disengaged from the gear member 68, as on any one of FIGS. 14–18.

The operation of the tape recording and/or reproducing apparatus according to an embodiment of this invention will now be described.

Initially, for loading a tape cassette 1 into the apparatus, the push-button 86b on the stop/eject slide member 86 is depressed, as shown on FIG. 17. In response thereto, the bearing member 96 at the forward end of the coupling lever 95 is displaced rearwardly by the bearing edge 86a at the back end of the slide member 86 with the result that the coupling lever 95 is bodily displaced rearwardly together with the supporting slide member 92. The bearing member 97 at the back end of the rearwardly displaced coupling lever 95 acts on the bearing portion 75a on the lever 75 so that the latter is turned in the clockwise direction, as viewed on FIG. 17, and the head base structure 50 is rearwardly moved for disposing the head drum assembly 21 in its rearmost position shown on FIG. 9. With the head drum assembly 21 in such position, the cassette holder 44 is released from its locked condition in the loading position of FIG. 11 and may be moved to the cassette receiving and ejecting position of FIG. 10 by the torsion spring 44a on FIG. 10.

When a tape cassette 1 is inserted into the cassette holding portion 45 of the cassette holder 44 disposed in the cassette receiving and ejecting position, the lid 10 of the tape cassette is automatically moved upwardly to an opened position thereof by the action of the arcuate flanges 47 in the cassette holder. As was described with reference to FIGS. 3A and 3B, in one orientation of the tape cassette 1 as it is inserted in the cassette holding portion 45, the flanges 47 will cause opening of the lid to the position shown in full lines at 10 on FIG. 3B. However, if the cassette casing is turned over or inverted and then inserted into the cassette holding portion 45, the arcuate flanges 47, in again raising the lid, will cause the lid to assume the opened position indicated in dot-dash lines at 10' on FIG. 3B.

Thus, the tape recording and/or reproducing apparatus embodying this invention is desirably of the type in which the magnetic tape 4 is divided at its median into two longitudinally extending regions with so-called helical scan recording being effected in oblique tracks in one of such longitudinal regions when the tape cassette 1 is inserted in one orientation into the cassette holding portion 45, while helical scan recording in oblique tracks is similarly effected in the other longitudinal region on the tape when the tape cassette 1 is inserted in another or inverted orientation.

After the tape cassette 1 has been fully inserted into the cassette holding portion 45 of the cassette holder 44, the latter is suitably downwardly rocked to its horizontal loading position so that the tape cassette 1 attains its operative position on the cassette loading portion 27 of the sub-chassis 12. When the tape cassette 1 has attained its operative position, the locking of the head drum assembly 21 in its rearmost position shown on FIG. 9 is suitably released, with the result that the spring 84 can then become active to turn the drum moving lever 75 in the counter-clockwise direction, as viewed from above, until the stop portion 75b on the right-hand portion of the lever 75 comes into engagement with the lug 80 on the play slide member 77. Upon such engagement of the stop portion 75b with the lug 80, as on FIG. 14, the head drum assembly 21 attains the position shown in FIG. 8. The condition of the mode selecting mechanism shown in FIG. 14, corresponds to a stop mode in which the idler gears 68 and 69 are disengaged from the play gear 30, the fast-forward gear 35 and the rewind gear 39.

If the fast-forward slide member 105 is depressed at a time when the mode selecting mechanism is in the condition of FIG. 14 to select the stop mode, the fast-forward gear 35 is moved into engagement with the idler gear 68, as in FIG. 19, and the drum motor 64 of the head drum assembly 21 is operated so that the fast-forward mode is established in which the real base 14 is rotated at a high speed in the tape take-up direction.

Figure 18:
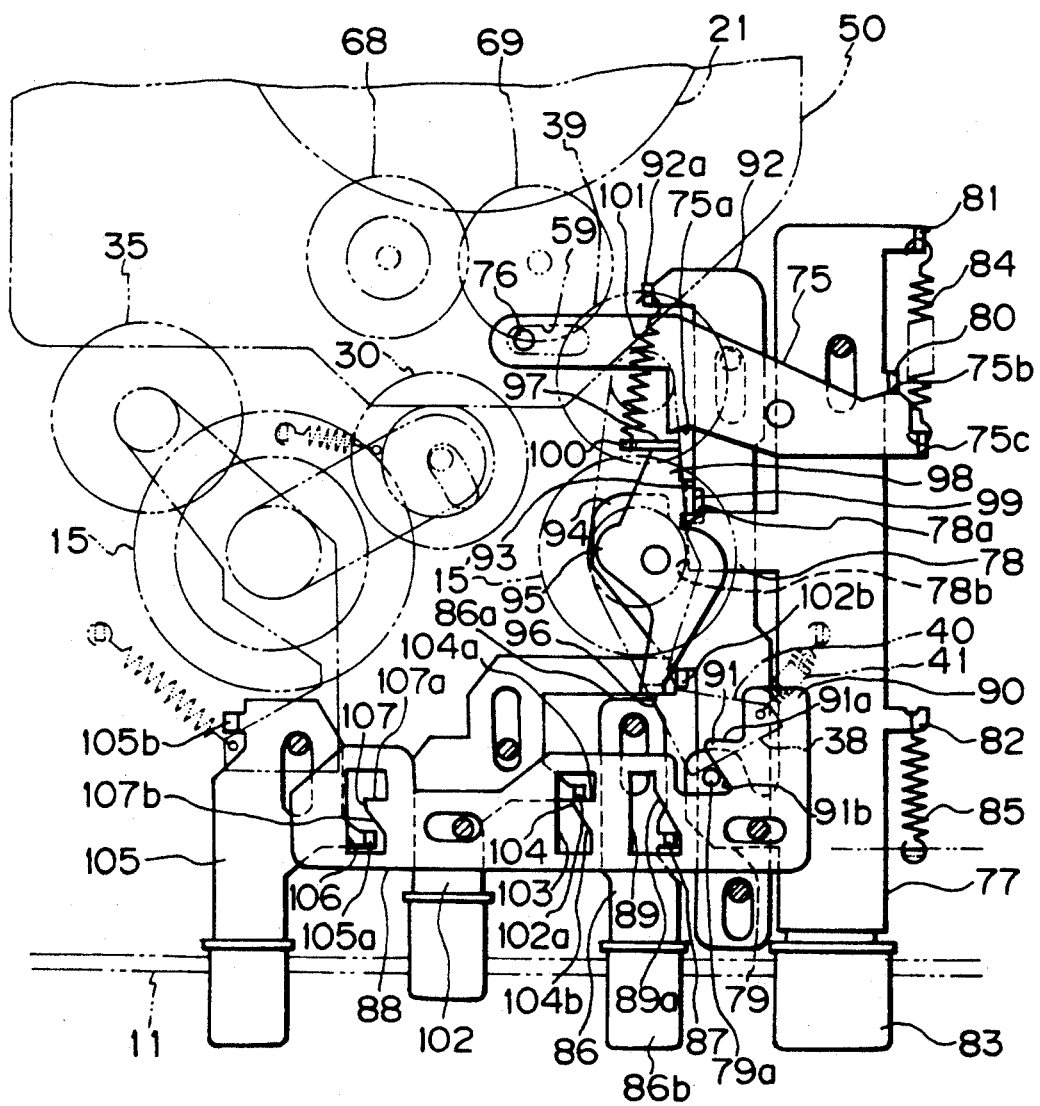
FIG. 18 is a view similar to that of FIG. 14, but showing the condition of the mode selecting mechanism when actuated for achieving a rewinding operation.

On the other hand, if the rewind slide member 102 is depressed starting with the mode selecting mechanism in the condition of FIG. 14 for selecting the stop mode, the rewind gear 39 is moved into engagement with the idler gear 69 and the drum motor 64 is again operated so that the reel base 13 is rotated at a high speed in the tape take-up direction for establishing the rewind mode of the apparatus, as shown in FIG. 18.

It will be appreciated that, when establishing either the rewind mode, as in FIG. 18, or the fast-forward mode, as in FIG. 19, the head drum assembly 21 remains in the position shown on FIG. 8 in which it projects slightly into the cavity of the open cassette casing 2 and thereby causes the rotary magnetic heads 23 to effect light contact with the magnetic tape run 4a extending between the pinch rollers 9. Therefore, while the magnetic tape 4 is being transported at a high speed in the fast-forward or rewind mode, as described above, the rotary magnetic heads 23 can read or play back signals recorded on the tape so as to perform a searching operation.

Change-over to the high speed fast-forward mode or rewind mode, with or without the simultaneous searching operation, can be executed directly from a mode other than the stop mode of FIG. 14. Such direct change-over is possible because, when the rewind slide member 102 or the fast-forward slide member 105 is depressed for establishing the rewind mode or the fast-forward mode, respectively, the locking plate 88 is initially moved to its unlocked or released position, whereby the previously established mode is cancelled prior to the establishment of the rewind mode or the fast-forward mode in response to depression of the slide member 102 or 105, respectively. For example, if the mode selecting mechanism is in the condition shown on FIG. 15 for establishing the recording and/or reproducing mode of the apparatus at the time when the rewind slide member 102 is depressed, the depression of the slide member 102 causes its locking element 102a to act against the oblique edge 104b of the nose 104 so as to displace the locking plate 88 toward the right, as viewed on FIG. 15, with the result that the locking pin 79a on the play slide member 77 is released from the nose 91 to permit the spring 85 to return the slide member 77 to its rest position, as on FIG. 18. Such return of the slide member 77 to its rest position occurs prior to the engagement of the locking element 102a by the surface 104a of the nose 104 for retaining the rewind slide member 102 in its depressed position which establishes the rewind mode as previously described.

Figure 15:
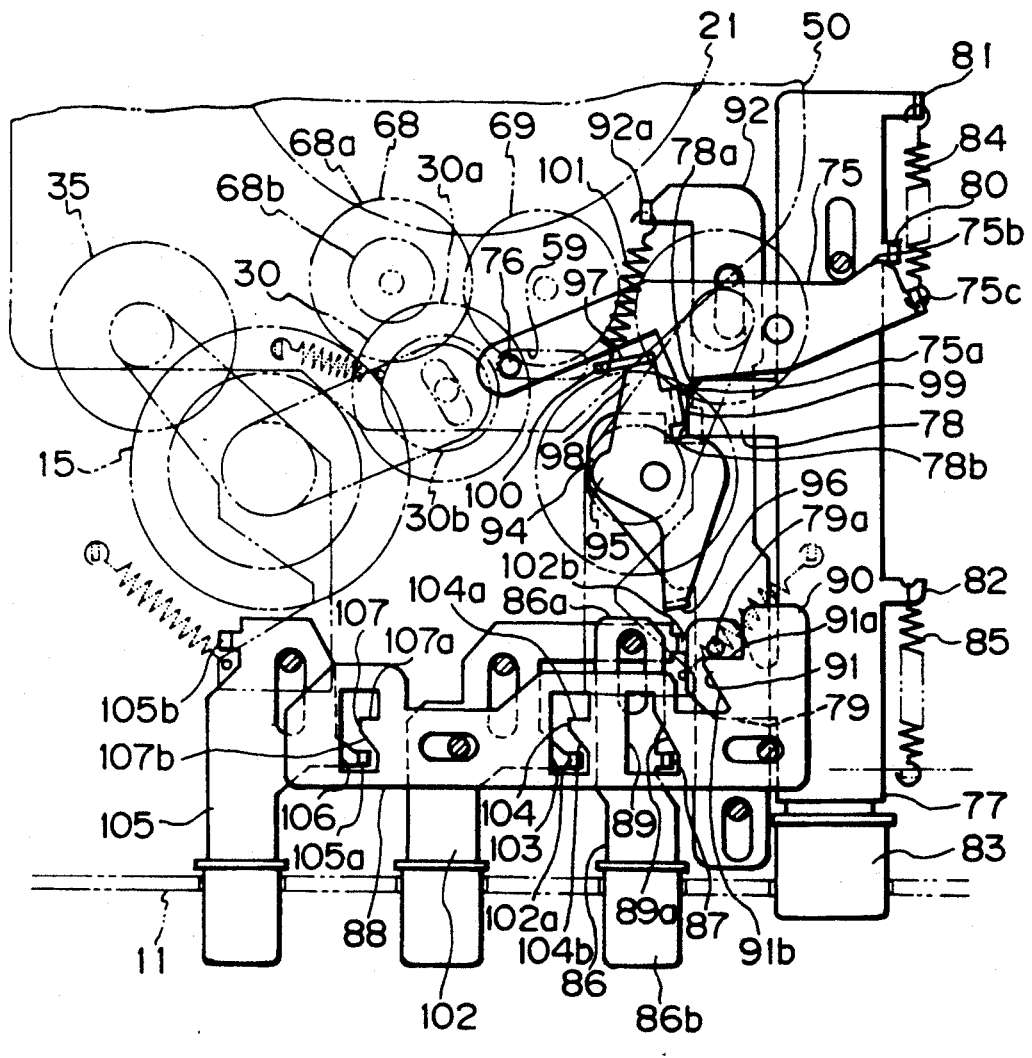
FIG. 15 is a view similar to that of FIG. 14, but showing the mode selecting mechanism actuated for selecting a recording or reproducing mode.

Of course, when the play slide member 77 is depressed, as in FIG. 15, the head drum assembly 21 is moved to its foremost position shown in FIG. 7 and the relatively small gear 68b of the coupling gear member 68 is moved into engagement with the large gear 30a of the play gear 30 as previously described. As a result of such meshing engagement of the gears 30a and 68b, the play gear arm 29 is angularly displaced in the clockwise direction against the resistance of the spring 33 so that the latter is tensioned for establishing a desired pressure contact between the gears 68b and 30a. With operation of the drum motor 64, the reel base 14 is rotated in the tape take-up direction and the capstan is rotated through engaged gears 67b and 73 for establishing the recording or reproducing mode of the apparatus.

The recording or reproducing mode of the apparatus is cancelled by depressing the stop/eject slide member 86, the rewind slide member 102 or the fast-forward slide member 105 which, in each case, causes movement of the locking plate 88 to its released position in which the locking pin 79a on the play slide member 77 is released from the nose 91 to permit the return of the slide member 77 to its rest position by the spring 85 prior to the establishment of the mode to which the depressed slide member 86, 102 or 105 corresponds.

In the tape recording and/or reproducing apparatus according to an embodiment of this invention which has been described above with reference to FIGS. 4–19, the head drum assembly 21 is of the type having fixed upper and lower drums 24 and 25 between which there is situated a rotatable middle drum portion 22 carrying the rotary magnetic heads 23. Further, such rotatable middle drum portion 22 is secured to the rotary hollow shaft 64a of the integral motor 64 for directly driving the rotary heads, with the motor shaft 64a having a lower end portion 64'a extending downwardly from the motor and having a drive gear 65 thereon which forms an input to a gear transmission by which other rotary elements, such as, the capstan 72 and the reel bases 13 and 14 are selectively driven. However, other positional relationships of the head drum, the integral motor and the drive gear forming the input to the gear transmission may be employed in accordance with the present invention.

Figure 20:
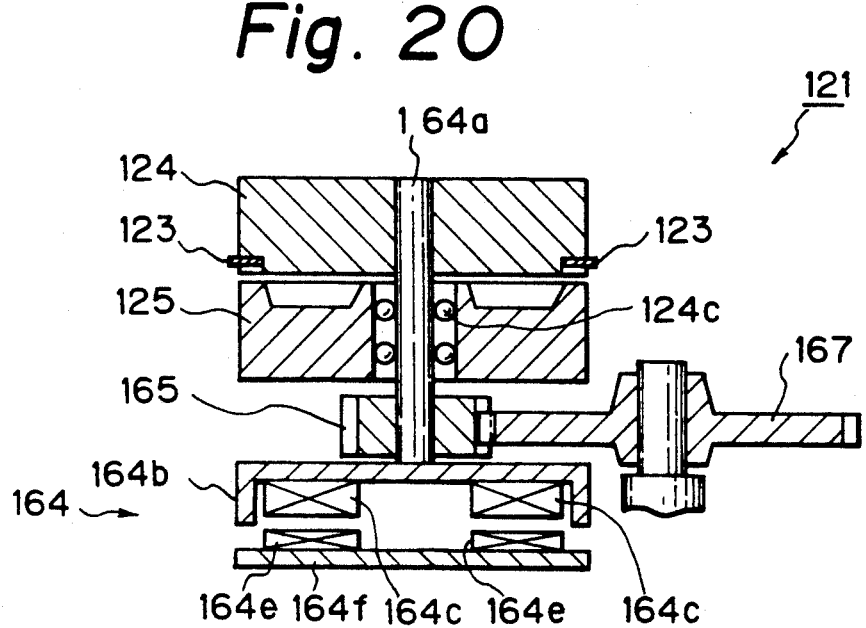

For example, in the head drum assembly 121 according to another embodiment of this invention which is shown on FIG. 20, and in which the several diagrammatically illustrated parts are identified by the same reference numerals applied to the corresponding parts in the embodiment of FIGS. 4–19, but with the numeral "1" appended thereto as the initial digit, the rotary magnetic heads 123 are carried by the upper drum 124 which is rotatable with the motor shaft 164a relative to the fixed lower drum 125 containing a shaft bearing 124c. Further, in the head drum assembly 121, the drive gear 165 meshing with the transfer gear 167 and forming the input to a gear transmission for driving the capstan and reel bases is secured on the motor shaft 164a axially between the lower fixed drum 125 of the head drum and the motor 164 which is shown to include a rotor 164b fixed to the shaft 164a and having a rotor magnet 164c, and a stator having a stator coil 164e on a fixed back yoke 164f.

Figure 21:
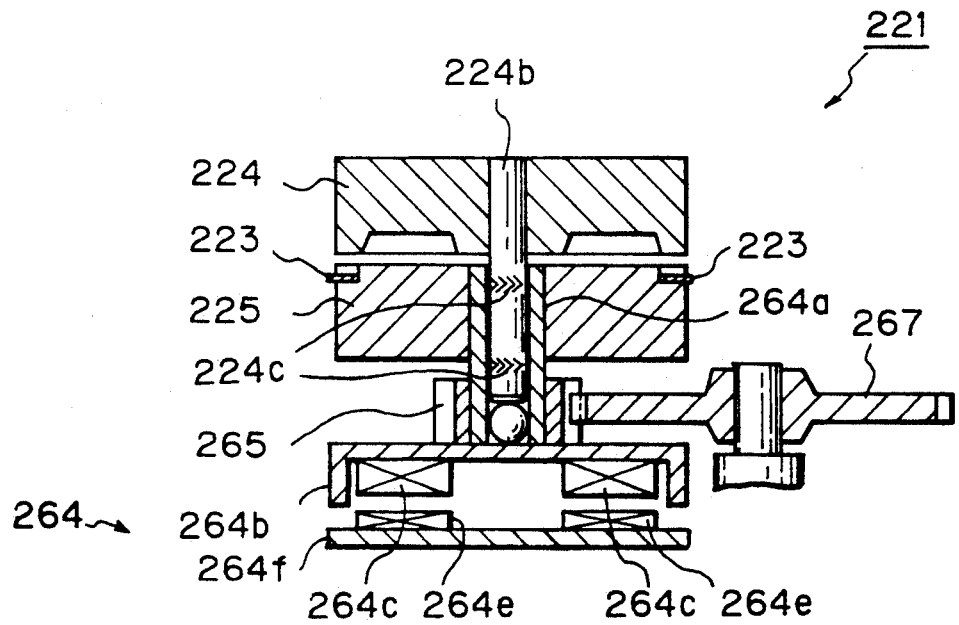

In a head drum assembly 221 according to another embodiment of this invention illustrated in FIG. 21, and in which the several diagrammatically illustrated parts are identified by the same reference numerals as the corresponding parts in the embodiment of FIGS. 4–19, but with the numeral "2" appended thereto as the initial digit, the upper drum 224 is fixed and the lower drum 225 is rotatable and carries the rotary magnetic heads 223. Further, in the embodiment of FIG. 21, a fixed shaft 224b is secured at its upper end to the fixed upper drum 224 and depends axially therefrom. The fixed shaft 224b is shown to have dynamic pressure grooves 224c on its peripheral surface below the fixed upper drum 224 so as to provide a low friction bearing for a rotatable tubular shaft 264a of the motor 264 which is again an integral part of the head drum assembly 221. The rotary lower drum 225 is secured on the motor shaft 264a which, at its lower end, is fixed to the rotor 264b having a rotor magnet 264c. The motor 264 further includes a stator coil 264e on a fixed back yoke 264f in confronting facing relation to the rotor magnet 264c. Once again, in the head drum assembly 221 according to this invention, the drive gear 265 meshing with the transfer gear 267 and forming the input to the gear transmission for driving the capstan and reel bases is fixed on the motor shaft 264a axially between the lower drum 225 and the motor 264.

Referring now to FIG. 22, it will be seen that, in a head drum assembly 321 according to another embodiment of this invention there shown, the several diagrammatically illustrated parts are again identified by the same reference numerals as the corresponding parts in the embodiment of FIGS. 4–19, but with the numeral "3" appended thereto as the initial digit. The head drum assembly 321 is generally similar to the head drum assembly 121 described with reference to FIG. 20 except that, in the case of the head drum assembly 321, the rotatable motor shaft 364a has an end portion extending above the rotatable upper drum 324, and the drive gear 365 meshing with the transfer gear 367 and forming the input to the gear transmission is fixed on the upper end of the shaft 364a above the rotary upper drum.

A head drum assembly 421 according to still another embodiment of this invention is shown in FIG. 23 to have its several diagrammatically illustrated parts again identified by the same reference numerals employed in connection with the corresponding parts of the embodiment of FIGS. 4–19, but with the reference numeral "4" appended thereto as the initial digit. The head drum assembly 421 is generally similar to the head drum assembly 321 of FIG. 22 except that the rotary motor shaft 464a to which the rotatable upper drum 424 is secured, has a lower end portion projecting below the motor 464 and having the drive gear 465 secured thereon for meshing engagement with the transfer gear 467.

Thus, it will be appreciated that, in an apparatus according to the present invention, the head drum assembly may be of the type having fixed upper and lower drums with a rotary middle drum portion disposed therebetween to carry the rotary magnetic heads, as in the embodiment of FIGS. 4–19, or the drum assembly may have the rotary magnetic heads mounted on a rotatable upper drum, as in FIGS. 20, 22 and 23 or on a rotatable lower drum, as in FIG. 21. Further, the motor integral with the head drum assembly for directly driving the rotary magnetic heads may have the drive gear 65, 165, 265, 365 or 465 mounted on an end portion of the motor shaft projecting downwardly below the motor, as in FIGS. 13 and 23, on an intermediate portion of the motor shaft between the motor and the adjacent drum, as in FIGS. 20 and 21, or on an end portion of the motor shaft projecting above the upper drum, as in FIG. 22.

In all of the embodiments of the invention described above with reference to FIGS. 4–19, 20, 21, 22 and 23, respectively, a motor integrated with the head drum for directly driving the rotary magnetic heads associated with the head drum has also been used to drive a non-slip transmission through which driving forces are imparted to a capstan and the take-up and supply reel bases. Such arrangement clearly facilitates the miniaturization of the tape recording and/or reproducing apparatus and minimizes the current demands thereof by employing a single motor for driving all rotary elements while ensuring that the various rotary elements will be synchronously driven. However, in apparatus embodying this invention, the single motor may be integrated with the capstan for directly driving the latter and a gear or other non-slip transmission may be driven by such single motor for effecting rotation of the rotary magnetic heads and the reel bases. As another alternative, the single motor may be integrated with a take-up reel base for directly driving the latter, while a gear or other non-slip transmission is driven by such single motor for effecting rotation of the rotary magnetic heads and the capstan.

Although various embodiments of the present invention, and several modifications thereof, have been described in detail herein with reference to the accompanying drawings, it is to be understood that the invention is not limited to those precisely mentioned embodiments and modifications, and that various changes and further modifications may be effected therein by one skilled in the art without departing from the scope or spirit of the invention as defined in the appended claims.

What is claimed is:

1. In a tape recording and/or reproducing apparatus having a head drum and a plurality of rotary elements including at least rotary head means associated with said head drum for recording and/or reproducing information signals on a magnetic tape wrapped around at least a portion of a peripheral surface of said head drum, a capstan for transporting the magnetic tape at a constant speed, and supply and take-up reel bases for engaging a pair of reels around which the magnetic tape is wound in a tape cassette casing and for driving the respective reels; the combination of a single motor, means for directly connecting said motor to one of said rotating elements, and means also connected with said motor for establishing a non-slip mechanical transmission between said motor and the remainder of said rotary elements and thereby synchronously rotating at least said rotary head means, said capstan and said take-up and supply reel bases.

2. A tape recording and/or reproducing apparatus according to claim 1; wherein said single motor is integrated with said head drum and is directly coupled with said rotary head means.

3. A tape recording and/or reproducing apparatus according to claim 2; wherein said means for establishing a non-slip mechanical transmission consists of a gear train including selectively engageable rotary gears.

4. In a tape recording and/or reproducing apparatus having a head drum which includes a rotatable drum portion and a plurality of rotary elements including at least rotary head means mounted on said rotatable drum portion for recording and/or reproducing information signals on a magnetic tape wrapped around at least a portion of a peripheral surface of said head drum, a capstan for transporting the magnetic tape at a constant speed, and supply and take-up reel bases for engaging a pair of reels around which the magnetic tape is wound in a tape cassette casing and for driving the respective reels; the combination of a single motor integrated with said head drum and including a stator and a rotatable rotor, a rotatable shaft connected to said rotor and said rotatable drum portion so that said motor is directly coupled with said rotary head means through said shaft, and means for establishing a non-slip mechanical transmission between said motor and the remainder of said rotary elements comprising a gear train including selectively engageable rotary gears and a drive gear on said shaft forming an input for said gear train.

5. A tape recording and/or reproducing apparatus according to claim 4; wherein said drive gear is positioned on said shaft axially between said head drum and said motor.

6. A tape recording and/or reproducing apparatus according to claim 4; wherein said shaft extends axially through said head drum and said motor and has an end portion on which said drive gear is positioned.

7. A tape recording and/or reproducing apparatus according to claim 6; wherein said end portion of the shaft on which said drive gear is positioned extends from said motor in an axial direction away from said head drum.

8. A tape recording and/or reproducing apparatus according to claim 6; wherein said end portion of the shaft on which said drive gear is positioned extends from said head drum in an axial direction away from said motor.

9. A tape recording and/or reproducing apparatus comprising:
a head drum;
a plurality of rotary elements including at least rotary head means associated with said head drum for recording and/or reproducing information signals on a magnetic tape wrapped around at least a portion of a peripheral surface of said head drum, a capstan for transporting the magnetic tape at a constant speed, and supply and take-up reel bases for engaging a pair of reels around which the magnetic tape is wound in a tape cassette casing and for driving the respective reels;
a single motor directly coupled to one of said rotating elements;
means also connected with said motor for establishing a non-slip mechanical transmission between said motor and the remainder of said rotary elements and thereby synchronously rotating at least said rotary head means, said capstan and said take-up and supply reel bases;
first support means on which said head drum is mounted;
second support means on which said supply and take-up reel bases are mounted; and
guide means mounting said first support means for movement relative to said second support means.

10. A tape recording and/or reproducing apparatus according to claim 9; further comprising capstan support means carried by said first support means and on which said capstan is mounted.

11. A tape recording and/or reproducing apparatus according to claim 9; wherein said second support means constitutes a main chassis, and said guide means is formed on a sub-chassis which has a cassette loading portion with means thereon for locating a tape cassette casing; and further comprising elastic mounting means for supporting said sub-chassis parallel to said main chassis at least at three spaced apart points so as to avoid transmission of any distortion of said main chassis to said cassette loading portion of the sub-chassis.

12. A tape recording and/or reproducing apparatus according to claim 9; further comprising mode selecting means operable for selectively positioning said first support means relative to said second support means in a first position corresponding to recording and reproducing modes and at which a substantial part of said head drum is inserted into a tape cassette casing having its reels engaged by said supply and take-up reel bases so that the magnetic tape extending between said reels is wrapped around a substantial portion of said peripheral surface of the head drum for scanning by said rotary head means, and a second position corresponding to cassette loading and unloading modes and at which said head drum is fully withdrawn from the tape cassette casing.

13. A tape recording and/or reproducing apparatus according to claim 12; wherein said mode selecting means is further operable for selectively positioning said first support means relative to said second support means in a third position corresponding to stop, fast-forward and rewind modes and at which said head drum is disposed intermediate said first and second positions thereof so as to be only slightly inserted into the tape cassette casing.

14. A tape recording and/or reproducing apparatus according to claim 13; wherein said peripheral surface of the head drum comes into contact with the magnetic tape extending between the reels engaging said reel bases in said third position of the first support means relative to said second support means so that said rotary head means can scan the magnetic tape in a fast search mode.

15. A tape recording and/or reproducing apparatus according to claim 13; wherein said tape cassette casing contains pinch roller means around which the magnetic tape is guided; and further comprising means mounting said capstan on said first support means so as to bear against said pinch roller means with the tape therebetween only when said first support means is in said first position relative to said second support means.

16. A tape recording and/or reproducing apparatus according to claim 13; wherein said means for establishing a mechanical transmission has an engaged state for driving said capstan and reel bases with said rotary head means when said first support means is in one of said first and third positions relative to said second support means, and said means for establishing a mechanical transmission is disengaged, at least between said rotary head means and said reel bases, when said first support means is in said second position.

17. A tape recording and/or reproducing apparatus according to claim 13; wherein said guide means permits said first support means to move slightly relative to said second support means in lateral directions which are along the tape scanned by said rotary head means when said first support means is in said first position thereof, and said guide means prevents the movement of said first support means in said lateral directions at least when said first support means is in said second position.

18. A tape recording and/or reproducing apparatus according to claim 13; further comprising cassette holding means movable between a cassette receiving and ejecting position and a loading position in which a tape cassette in said holding means is operatively positioned to engage said reels with said reel bases, and means for moving said first support means from said second position to said third position following movement of said cassette holding means to said loading position.

19. A tape recording and/or reproducing apparatus according to claim 9; wherein said single motor is integrated with said head drum and is directly coupled with said rotary head means.

* * * * *